US011013038B2

(12) United States Patent
Guo et al.

(10) Patent No.: US 11,013,038 B2
(45) Date of Patent: May 18, 2021

(54) METHOD AND APPARATUS FOR RACH PROCEDURE IN WIRELESS SYSTEMS

(71) Applicant: Samsung Electronics Co., Ltd., Suwon-si (KR)

(72) Inventors: Li Guo, Allen, TX (US); Young-Han Nam, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 16/523,923

(22) Filed: Jul. 26, 2019

(65) Prior Publication Data

US 2019/0350010 A1 Nov. 14, 2019

Related U.S. Application Data

(63) Continuation of application No. 15/826,421, filed on Nov. 29, 2017, now Pat. No. 10,405,354.

(Continued)

(51) Int. Cl.
*H04W 74/08* (2009.01)
*H04W 74/00* (2009.01)
(Continued)

(52) U.S. Cl.
CPC ....... *H04W 74/0833* (2013.01); *H04W 16/28* (2013.01); *H04W 72/0446* (2013.01);
(Continued)

(58) Field of Classification Search
CPC ............. H04W 74/0833; H04W 16/28; H04W 72/0446; H04W 74/004
See application file for complete search history.

(56) References Cited

U.S. PATENT DOCUMENTS

2004/0029604 A1 * 2/2004 Raaf .................... H04B 7/00
2004/0082356 A1 * 4/2004 Walton .................. H04B 7/00
(Continued)

FOREIGN PATENT DOCUMENTS

WO 2016129970 A1 8/2016

OTHER PUBLICATIONS

Fujitsu, Discussion on RAR in NR considering reciprocity issues, Nov. 2016 (Year: 2016).*
(Continued)

*Primary Examiner* — Ronald B Abelson

(57) ABSTRACT

A method of user equipment (UE) for random access operation in a wireless communication system is provided. The method comprises receiving, from a base station (BS), random access channel (RACH) configuration information including RACH chunk information corresponding to at least one antenna beam including a beam identifier (ID), determining a RACH chunk based on the RACH configuration information received from the BS, transmitting, to the BS, a RACH preamble on the determined RACH chunk according to the RACH configuration information associated with the beam ID, and receiving, from the BS, a RACH response (RAR) corresponding to the transmitted RACH preamble and a downlink channel for a RAR transmission, wherein a random access-radio network temporary identification (RA-RNTI) is calculated based on an index of a slot and an index of the RACH chunk on which the RACH preamble is transmitted.

20 Claims, 15 Drawing Sheets

Related U.S. Application Data

(60) Provisional application No. 62/432,393, filed on Dec. 9, 2016.

(51) Int. Cl.
    *H04W 72/04*     (2009.01)
    *H04W 16/28*     (2009.01)
    *H04W 48/12*     (2009.01)

(52) U.S. Cl.
    CPC .......... *H04W 74/004* (2013.01); *H04W 48/12* (2013.01); *H04W 72/0453* (2013.01); *H04W 74/006* (2013.01); *H04W 74/008* (2013.01)

(56) References Cited

U.S. PATENT DOCUMENTS

| | | | |
|---|---|---|---|
| 2008/0233941 A1* | 9/2008 | Jen | H04M 3/00 |
| 2010/0255847 A1* | 10/2010 | Lee | H04B 7/005 |
| 2018/0042050 A1 | 2/2018 | Kim et al. | |

OTHER PUBLICATIONS

"3rd Generation Partnership Project; Technical Specification Group Radio Access Network; Evolved Universal Terrestrial Radio Access (E-UTRA); Physical Channels and Modulation (Release 13)," 3GPP TS 36.211, V13.2.0, Jun. 2016, 168 pages.

"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.2.0, Jun. 2016, 140 pages.

"3rd Generation Partnership Project; Technical Specification Group Radio Access Network; Evolved Universal Terrestrial Radio Access (E-UTRA); Physical Layer Procedures (Release 13)," 3GPP TS 36.213, V13.2.0, Jun. 2016, 381 pages.

"3rd Generation Partnership Project; Technical Specification Group Radio Access Network; Evolved Universal Terrestrial Radio Access (E-UTRA); Medium Access Control (MAC) Protocol Specification (Release 13)," 3GPP TS 36.321, V13.2.0, Jun. 2016, 91 pages.

"3rd Generation Partnership Project; Technical Specification Group Radio Access Network; Evolved Universal Terrestrial Radio Access (E-UTRA); Radio Resource Control (RRC) Protocol Specification (Release 13)," 3GPP TS 36.331, V13.2.0, Jun. 2016, 623 pages.

Foreign Communication from Related Counterpart Application; PCT Patent Application No. PCT/KR2017/014408; International Search Report and Written Opinion of the International Searching Authority dated Mar. 14, 2018; 9 pages.

Fujitsu; "Discussion on RAR in NR considering reciprocity issues"; 3GPP TSG RAN WG1 Meeting #87; R1-1611462; Reno, USA; Nov. 14-18, 2016; 6 pages.

Huawei et al; "Considerations on NR RACH Preamble and Channel Design"; 3GPP TSG RAN WG1 Meeting #87; R1-1611694; Reno, USA; Nov. 14-18, 2016; 3 pages.

Sony; "Considerations on Multiple Beams RACH Procedure"; 3GPP TSG RAN WG1 Meeting #87; R1-1612890; Reno, USA; Nov. 14-18, 2016; 4 pages.

Samsung et al.; "WF on NR RACH Procedure for multi-beam operation without beam correspondence"; 3GPP TSG RAN WG1 #87; Reno, Nevada, USA; Nov. 14-18, 2016; 5 pages.

\* cited by examiner

METHOD AND APPARATUS FOR RACH PROCEDURE IN WIRELESS SYSTEMS

CROSS-REFERENCE TO RELATED APPLICATIONS AND CLAIM OF PRIORITY

This application is a continuation of U.S. patent application Ser. No. 15/826,421, filed Nov. 29, 2017, which claims priority to U.S. Provisional Patent Application No. 62/432,393, filed Dec. 9, 2016. The contents of the above-identified patent documents are incorporated herein by reference.

TECHNICAL FIELD

The present application relates generally to random access operation in wireless communication systems. More specifically, this disclosure relates to random access channel procedures of multi-beam operation in wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a user equipment (UE) for random access operation in a wireless communication system is provided. The UE comprises at least one transceiver configured to receive, from a base station (BS), random access channel (RACH) configuration information including RACH chunk information corresponding to at least one antenna beam including a beam identifier (ID) and at least one processor configured to determine an RACH chunk based on the RACH configuration information received from the BS. The transceiver is further configured to transmit, to the BS, an RACH preamble on the determined RACH chunk according to the RACH configuration information associated with the beam ID and receive, from the BS, an RACH response (RAR) corresponding to the transmitted RACH preamble, a random access-radio network temporary identification (RA-RNTI) of a downlink channel for an RAR transmission being calculated based on an index of a slot and an index of the RACH chunk on which the RACH preamble is transmitted.

In another embodiment, a base station (BS) for random access operation in a wireless communication system is provided. The BS comprises at least one processor configured to determine random access channel (RACH) configuration information including RACH chunk. The BS further comprises at least one transceiver configured to transmit, to a user equipment (UE), the RACH configuration information including RACH chunk information corresponding to at least one antenna beam including a beam identifier (ID), receive, from the UE, an RACH preamble on the RACH chunk according to the RACH configuration information associated with the beam ID, and transmit, to the UE, an RACH response (RAR) corresponding to the received RACH preamble, wherein a random access-radio network temporary identification (RA-RNTI) of a downlink channel for an RAR transmission is calculated based on an index of a slot and an index of the RACH chunk on which the RACH preamble is received.

In yet another embodiment, a method of user equipment (UE) for random access operation in a wireless communication system is provided. The method comprises receiving, from a base station (BS), random access channel (RACH) configuration information including RACH chunk information corresponding to at least one antenna beam including a beam identifier (ID), determining an RACH chunk based on the RACH configuration information received from the BS, transmitting, to the BS, an RACH preamble on the determined RACH chunk according to the RACH configuration information associated with the beam ID, and receiving, from the BS, an RACH response (RAR) corresponding to the transmitted RACH preamble and a downlink channel for an RAR transmission. Ae random access-radio network temporary identification (RA-RNTI) is calculated based on an index of a slot and an index of the RACH chunk on which the RACH preamble is transmitted.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures;" 3GPP TS 36.331 v13.0.0, "Radio Resource Control (RRC) Protocol Specification;" 3GPP TS 36.321 v13.0.0, "E-UTRA, Medium Access Control (MAC) protocol specification;" and 3GPP TS 36.331 v13.0.0, "E-UTRA, Radio Resource Control (RRC) Protocol Specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
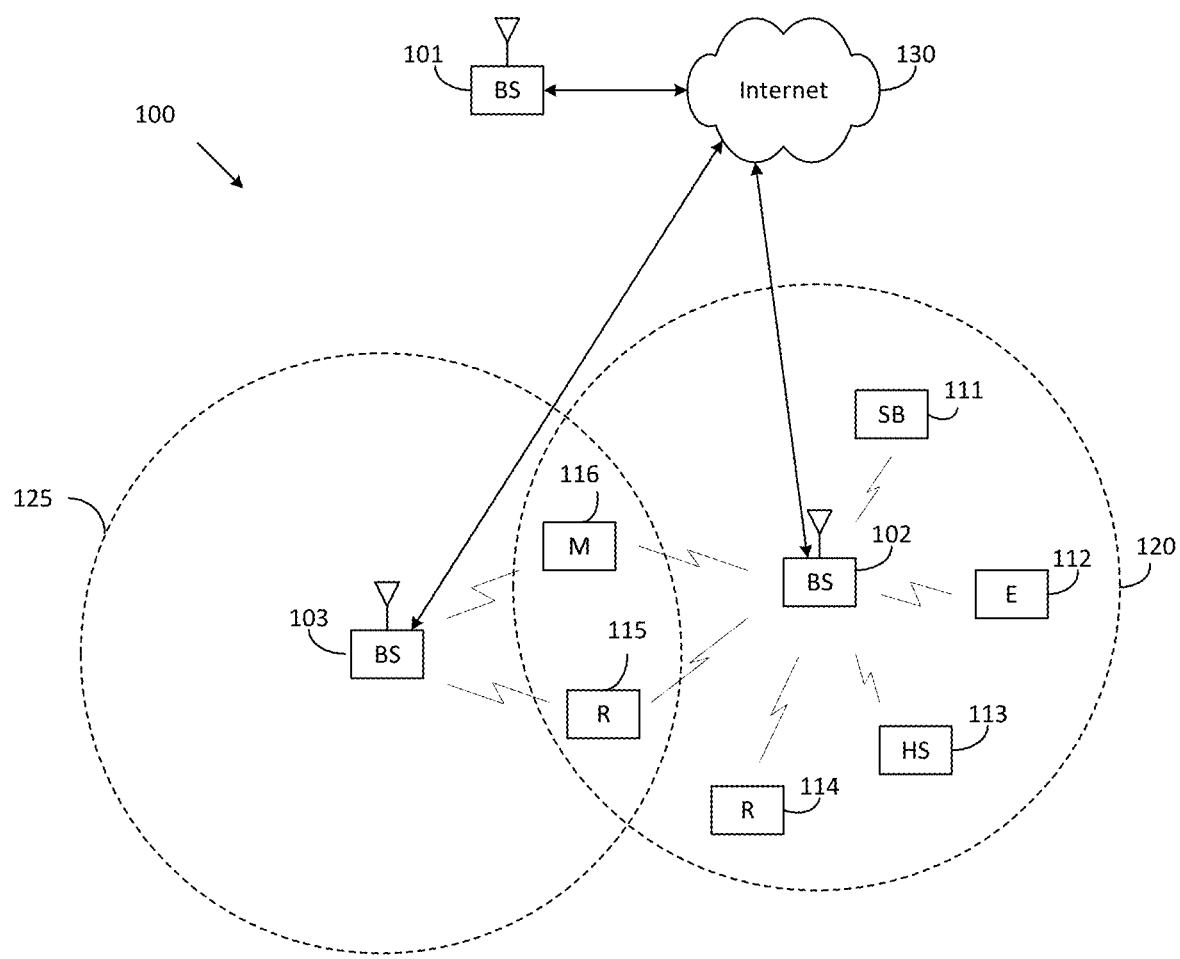
FIG. 1 illustrates an example wireless network according to embodiments of the present disclosure.
Figure 2:
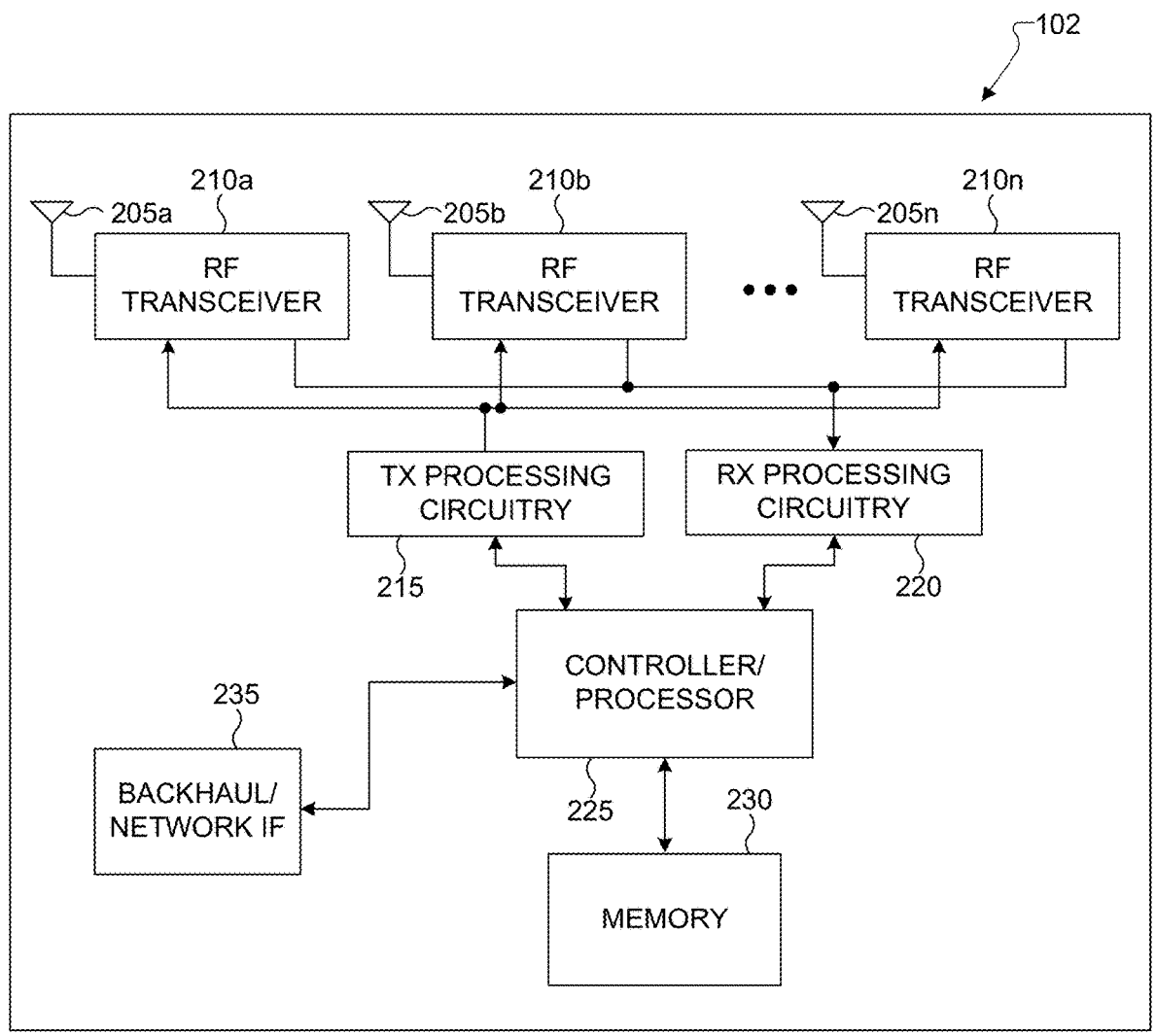
FIG. 2 illustrates an example eNB according to embodiments of the present disclosure.
Figure 3:
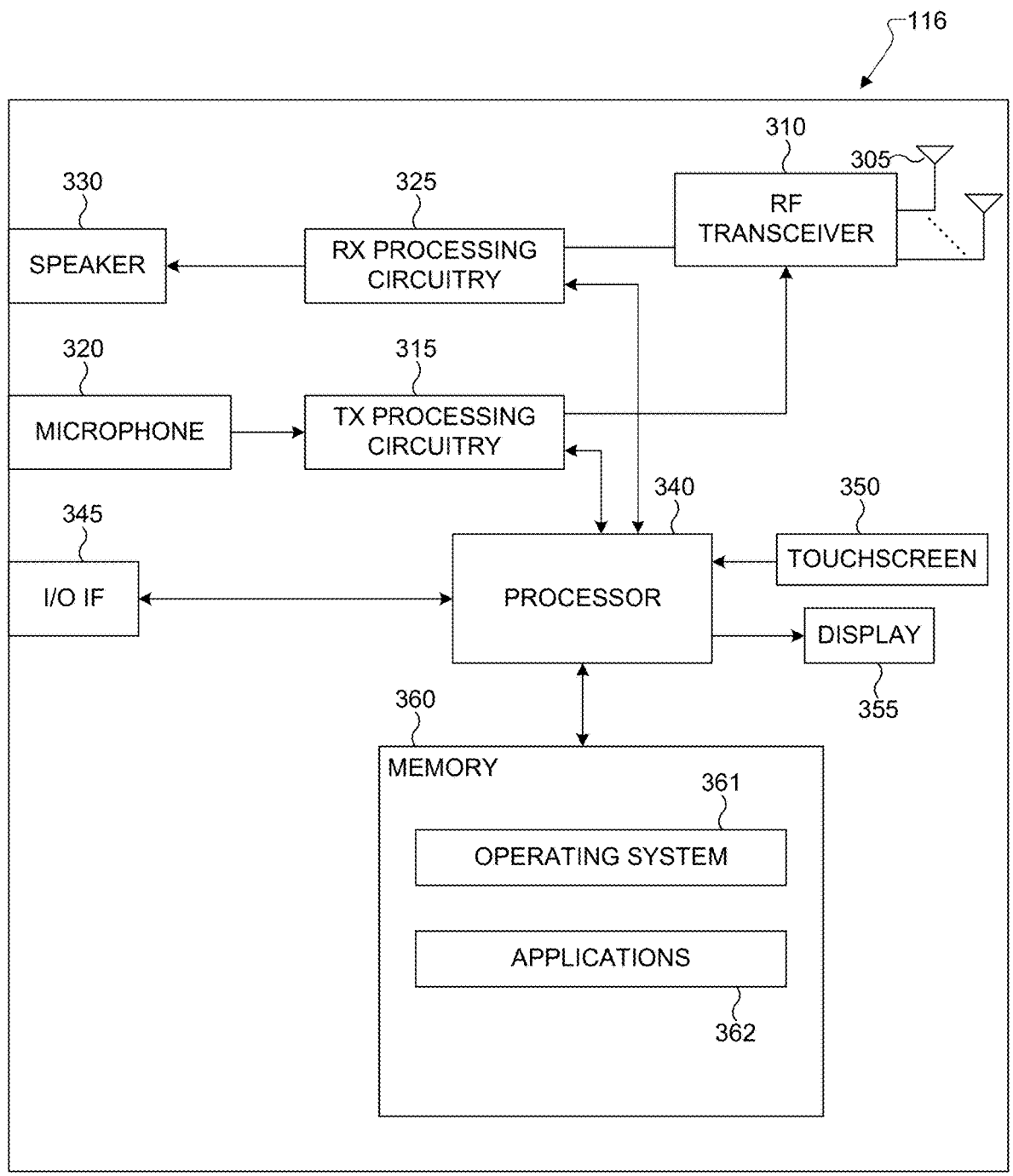
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting on PUCCH in an advanced wireless communication system. In certain embodiments, and one or more of the eNBs 101-103 includes circuitry, programing, or a combination thereof, for receiving efficient CSI reporting on PUCCH in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting, to a user equipment (UE), the RACH configuration information including RACH chunk information corresponding to at least one antenna beam including a beam identifier (ID) and an RACH response (RAR) corresponding to the received RACH preamble, wherein a random access-radio network temporary identification (RA-RNTI) of a downlink channel for an RAR transmission is calculated based on an index of a slot and an index of the RACH chunk on which the RACH preamble is received.

In some embodiments, the RF transceiver 210a-201n is capable of receiving the RACH preamble based on an RACH occasion by re-selecting, by the UE, other RACH chunks each of which includes RACH symbols based on the RACH chunk information or performing, by the UE, a power ramping that adjusts a transmit power of the RACH preamble. In such embodiments, the RACH configuration information comprises at least one of the index of the slot, the index of the RACH chunk, partitioning information, beam sweeping information, a preamble type, or retransmission information.

In some embodiments, the RF transceiver 210a-201n is capable of receiving the RACH preamble on dedicated resources over which the at least one antenna beam is applied to receive signals, the dedicated resources being identified based on the at least one antenna beam and the RACH preamble over RACH symbols in the determined RACH chunk over the at least one antenna beam that is swept to receive signals.

In some embodiments, the RF transceiver 210a-201n is capable of receiving the RACH preamble including the beam ID using the RACH chunk from the RACH chunks mapped to at least one downlink signal symbol selected and the RACH preamble including the beam ID using an RACH preamble sequence from the subset of RACH preamble sequences mapped to at least one downlink signal symbol selected.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of determining random access channel (RACH) configuration information including RACH chunk and mapping, based on the RACH configuration information, downlink signal symbols to RACH chunks, the downlink signal symbols transmitted on at least one of synchronization signal (SS), a broadcasting signal on a physical broadcasting channel (PBCH), or a beam reference signal (BRS).

In some embodiments, the controller/processor 225 is capable of mapping, based on the RACH configuration information, downlink signal symbols to a subset of RACH preamble sequences, the downlink signal symbols being conveyed by at least one of synchronization signal (SS), a broadcasting signal on a physical broadcasting channel (PBCH), or a beam reference signal (BRS).

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, from a base station (BS), random access channel (RACH) configuration information including RACH chunk information corresponding to at least one antenna beam including a beam identifier (ID), transmitting, to the BS, an RACH preamble on the determined RACH chunk according to the RACH configuration information associated with the beam ID, and receiving, from the BS, an RACH response (RAR) corresponding to the transmitted RACH preamble, a random access-radio network temporary identification (RA-RNTI) of a downlink channel for an RAR transmission being calculated based on an index of a slot and an index of the RACH chunk on which the RACH preamble is transmitted.

In some embodiments, the RF transceiver 310 is capable of transmitting the RACH preamble on dedicated resources over which the at least one antenna beam is applied to receive signals, the RACH preamble over RACH symbols in the determined RACH chunk over the at least one antenna beam that is swept to receive signals, the RACH preamble including the beam ID using the RACH chunk from the RACH chunks mapped to at least one downlink signal symbol selected, and the RACH preamble including the beam ID using an RACH preamble sequence from the subset of RACH preamble sequences mapped to at least one downlink signal symbol selected.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of determining an RACH chunk based on the RACH configuration information received from the BS, re-selecting other RACH chunks each of which includes RACH symbols based on the RACH chunk information, and performing a power ramping that adjusts a transmit power of the RACH preamble. In such embodiments, the RACH configuration information comprises at least one of the index of the slot, the index of the RACH chunk, partitioning information, beam sweeping information, a preamble type, or retransmission information.

In some embodiments, the processor 340 is capable of identifying dedicated resources for the BS to apply the at least one antenna beam, mapping, based on the RACH configuration information, downlink signal symbols to RACH chunks, the downlink signal symbols transmitted on at least one of synchronization signal (SS), a broadcasting signal on a physical broadcasting channel (PBCH), or a beam reference signal (BRS).

In some embodiments, the processor 340 is capable of mapping, based on the RACH configuration information, downlink signal symbols to a subset of RACH preamble sequences, the downlink signal symbols being conveyed by at least one of synchronization signal (SS), a broadcasting signal on a physical broadcasting channel (PBCH), or a beam reference signal (BRS).

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
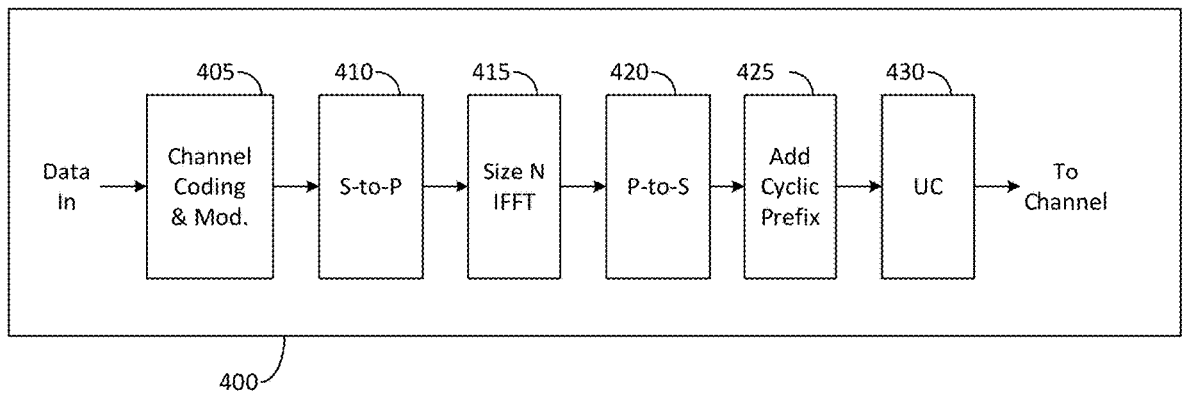
FIG. 4A illustrates an example high-level diagram of an orthogonal frequency division multiple access transmit path according to embodiments of the present disclosure.
Figure 4B:
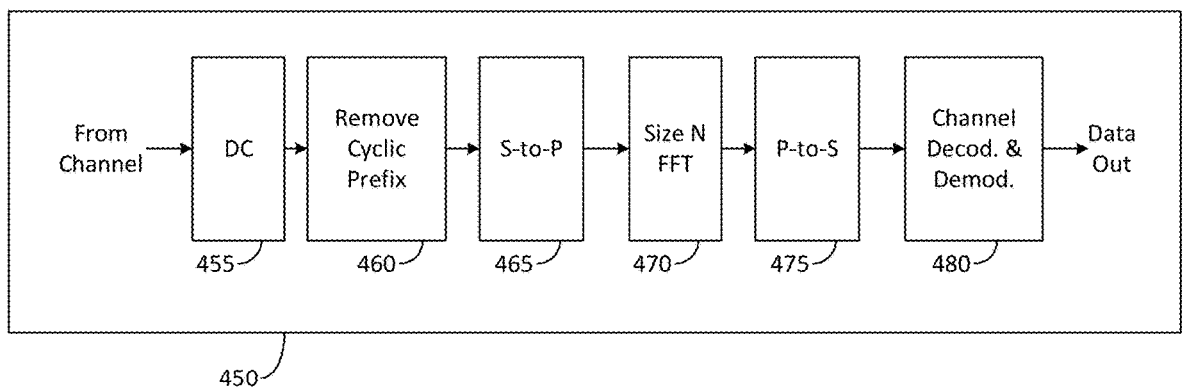
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

In LTE technologies, a time interval X which can contain one or more of the DL transmission part, guard, UL transmission part, and a combination of thereof regardless of they are indicated dynamically and/or semi-statically. Furthermore, in one example, the DL transmission part of time interval X contains downlink control information and/or downlink data transmissions and/or reference signals. In another example, the UL transmission part of time interval X contains uplink control information and/or uplink data transmissions and/or reference signals. In addition, the usage of DL and UL does not preclude other deployment scenarios e.g., sidelink, backhaul, relay). In some embodiments of the current disclosure, "a subframe" is another name to refer to "a time interval X," or vice versa. In order for the 5G network to support these diverse services are called network slicing.

In some embodiments, "a subframe" and "a time slot" can be used interchangeably. In some embodiments, "a subframe" refers to a transmit time interval (TTI), which may comprise an aggregation of "time slots" for UE's data transmission/reception.

Figure 5:
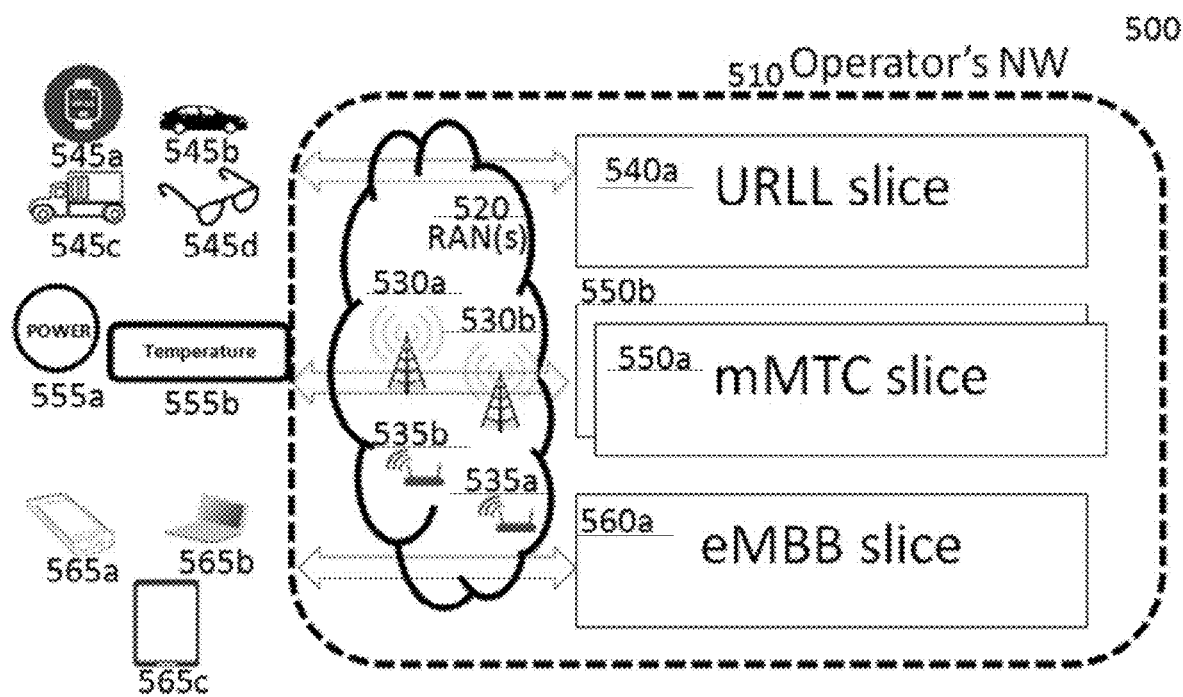
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530*a*, 530*b*, a plurality of small cell base stations 535*a*, 535*b*, a URLL slice 540*a*, a smart watch 545*a*, a car 545*b*, a, truck 545*c*, a smart glasses 545*d*, a power 555*a*, a temperature 555*b*, an mMTC slice 550*a*, an eMBB slice 560*a*, a smart phone (e.g., cell phones) 565*a*, a laptop 565*b*, and a tablet 565*c* (e.g., tablet PCs).

The operator's network 510 includes a number of radio access network(s) 520—RAN(s)—that are associated with network devices, e.g., eNBs 530*a* and 530*b*, small cell base stations (femto/pico eNBs or Wi-Fi access points) 535*a* and 535*b*, etc. The operator's network 510 can support various services relying on the slice concept. In one example, four slices, 540*a*, 550*a*, 550*b* and 560*a*, are supported by the network. The URLL slice 540*a* to serve UEs requiring URLL services, e.g., cars 545*b*, trucks 545*c*, smart watches 545*a*, smart glasses 545*d*, etc. Two mMTC slices 550*a* and 550*b* serve UEs requiring mMTC services such as power meters and temperature control (e.g., 555*b*), and one eMBB slice 560a requiring eMBB serves such as cells phones 565a, laptops 565b, tablets 565c.

In short, network slicing is a method to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
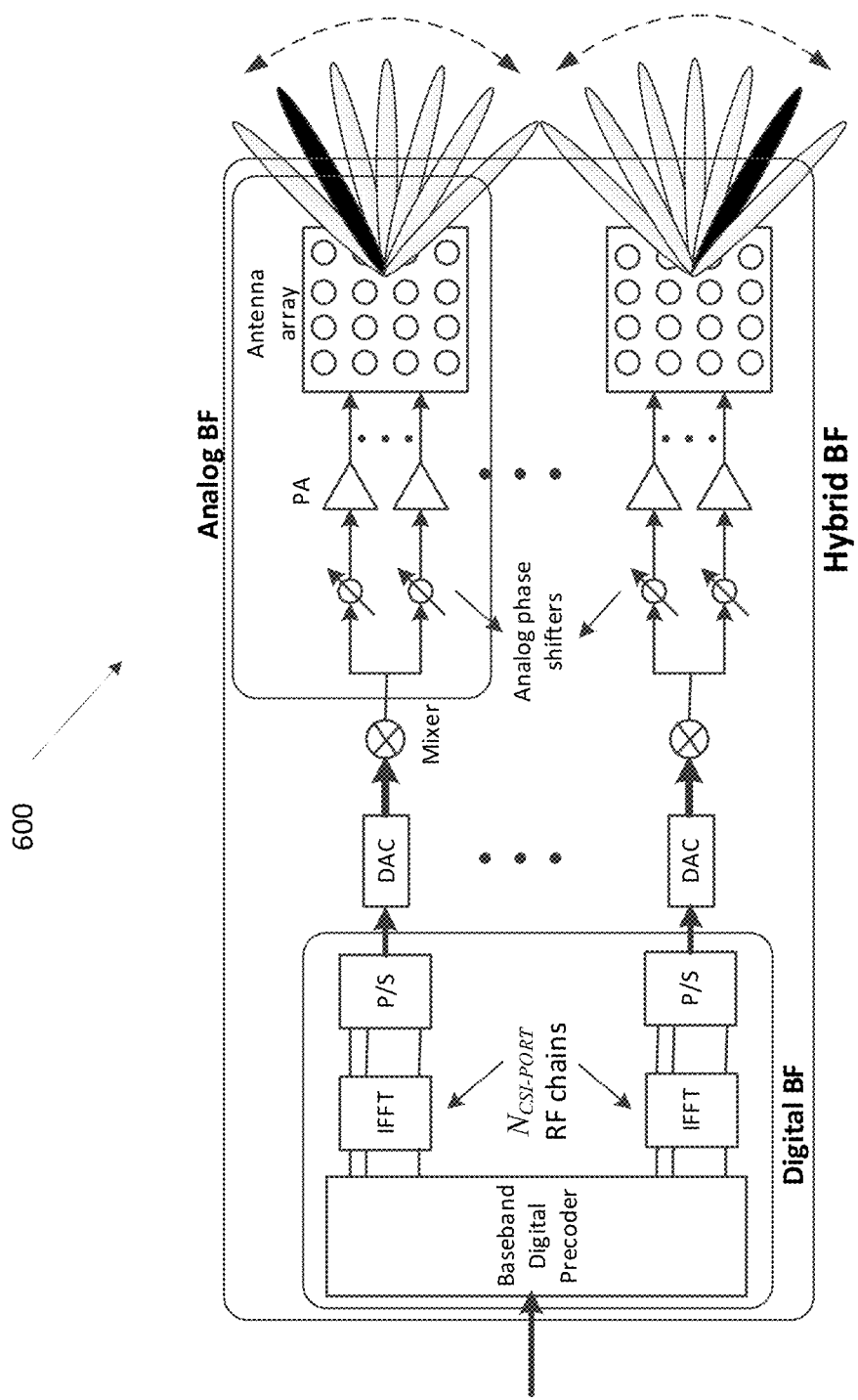
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 channel state information-reference signal (CSI-RS) antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

Figure 7:
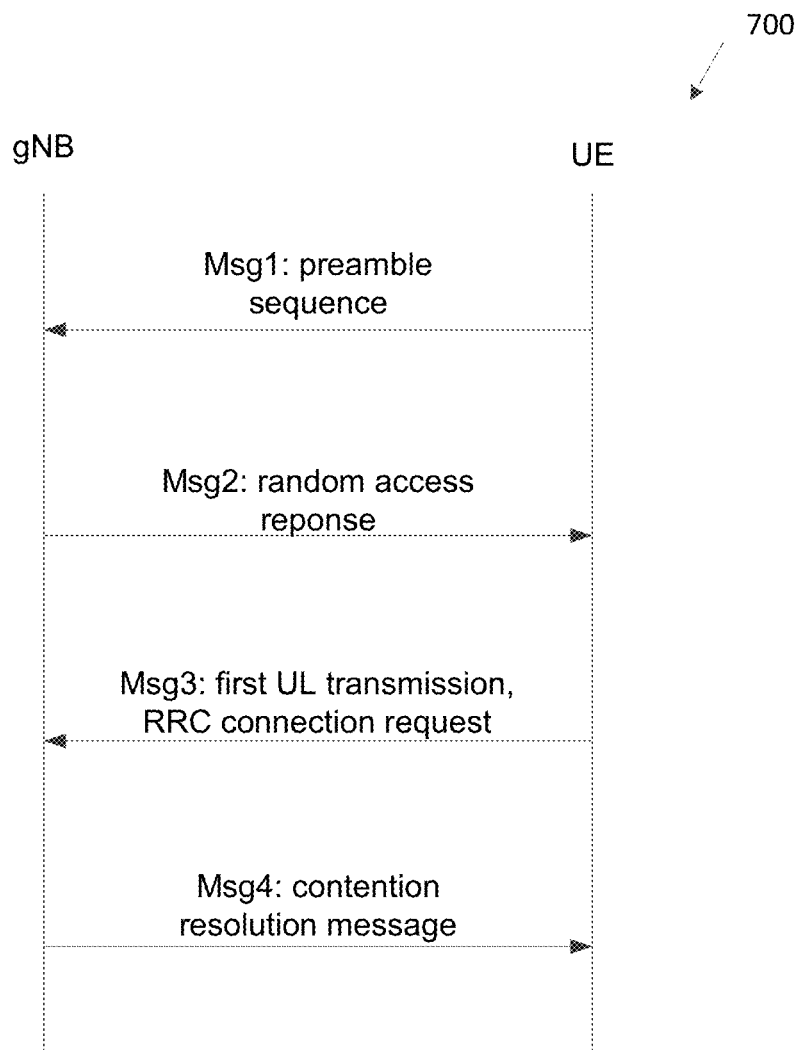
FIG. 7 illustrates an example random access procedures according to embodiments of the present disclosure.

FIG. 7 illustrates an example random access procedure 700 according to embodiments of the present disclosure. An embodiment of the random access procedure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

Before a UE can receive or transmit data to a gNB, the UE first needs to do the uplink random access procedure: to establish uplink synchronization between UE and gNB, such as timing advance; and to obtain the resource for RRC connection request.

In LTE specification, contention based random access procedure consists of four steps: a UE selects one of N RACH preamble sequences. UE selects one RACH time-slot based on the RACH configuration to transmit the preamble sequence. If UE does not receive RACH response from the gNB with some timer, UE increases the transmit power with a configured step size and re-send the RACH preamble; a gNB sends random access response (RAR) to UE for one detected preamble sequence. The RAR message conveys the information of a temporary C-RNTI, a timing advance value and an uplink resource grant for msg 3; after receiving the RAR, the UE sends msg3 RRC connection request message to gNB; and a gNB sends msg4 in response to the received msg3.

To cover different cell size, few preamble formats with different length of cyclic prefix (CP) and sequence are defined, as shown in TABLE 1.

TABLE 1

Preamble Formats

| Preamble Format | Length of CP (ms) | Length of sequence (ms) | Guard time (ms) |
|---|---|---|---|
| 0 | 0.103 | 0.8 | 0.097 |
| 1 | 0.684 | 0.8 | 0.516 |
| 2 | 0.203 | 1.6 | 0.197 |
| 3 | 0.684 | 1.6 | 0.716 |
| 4 | 0.015 | 0.133 | |

The random access design for new communication system such 5G has a few new challenges. In one example, a gNB needs to use multiple receive beams to cover the whole cell area in the uplink. In the design of RACH, the multi-beam based operation of the gNB may be considered for the coverage of RACH. In another example, the gNB may or may not have beam reciprocity between Tx and Rx beams. The design of random access may consider both cases. When the gNB does not have beam reciprocity, the UE is not able to identify the best gNB Rx beam for random access based on the downlink initial access signal the UE can measure; special design is needed to ensure the preamble sent from the UE is detected by the gNB successfully.

In yet another example, the UE may also have different level of beam reciprocity between UE's Tx and Rx beams. If UE has beam reciprocity, the UE is able to figure out which is the best beam for sending random access based on the downlink initial access signal measurement. However, if UE has no beam reciprocity, the UE may not be able to figure out the best transmit beam. In the design of random access, one needs to consider the beam reciprocity capability of UEs.

In some embodiments, the delay of random access, if the number of beams is large, the delay of random access may be large due to the multi-beam operation. How to minimize the random access delay is an important consideration in the design.

In some embodiments, one random access occasion consists of one or more RACH chunks and each RACH chunk consists of one or more RACH symbols. The number of RACH chunks in one random access occasion is Q>=1 and the number of RACH symbol in each RACH chunk is P>=1.

Once the random access preamble is transmitted and regardless of the possible occurrence of a measurement gap or a sidelink discovery gap for transmission or a sidelink discovery gap for reception, the MAC entity may monitor the PDCCH of the SpCell for sandom access sesponse(s) (RARs) identified by the RA-RNTI defined below, in the RA Response window which starts at the subframe that contains the end of the preamble transmission plus three subframes and has length ra-ResponseWindowSize. If the UE is a BL UE or a UE in enhanced coverage, RA Response window starts at the subframe that contains the end of the last preamble repetition plus three subframes and has length ra-ResponseWindowSize for the corresponding coverage level.

If the UE is an NB-IoT UE, in case the number of NPRACH repetitions is greater than or equal to 64, the RA Response window starts at the subframe that contains the end of the last preamble repetition plus 41 subframes and has length ra-ResponseWindowSize for the corresponding coverage level, and in case the number of NPRACH repetitions is less than 64, the RA Response window starts at the subframe that contains the end of the last preamble repetition plus 4 subframes and has length ra-ResponseWindowSize for the corresponding coverage level. The RA-RNTI associated with the PRACH in which the Random Access Preamble is transmitted, is computed as: RA-RNTI=1+t_id+10*f_id where t_id is the index of the first subframe of the specified PRACH (0≤t_id<10), and f_id is the index of the specified PRACH within that subframe, in ascending order of frequency domain (0≤f_id<6) except for NB-IoT UEs, BL UEs or UEs in enhanced coverage. If the PRACH resource is on a TDD carrier, the f_id is set to $f_{RA}$, where $f_{RA}$ is defined in LTE specification.

For BL UEs and UEs in enhanced coverage, RA-RNTI associated with the PRACH in which the random access preamble is transmitted, is computed as RA-RNTI=1+t_id+10*f_id+60*(SFN_id mod (Wmax/10)) where t_id is the index of the first subframe of the specified PRACH (0≤t_id<10), f_id is the index of the specified PRACH within that subframe, in ascending order of frequency domain (0≤f_id<6), SFN_id is the index of the first radio frame of the specified PRACH, and Wmax is 400, maximum possible RAR window size in subframes for BL UEs or UEs in enhanced coverage. If the PRACH resource is on a TDD carrier, the f_id is set to $f_{RA}$, where $f_{RA}$ is defined in LTE specification.

For NB-IoT UEs, the RA-RNTI associated with the PRACH in which the Random Access Preamble is transmitted, is computed as RA-RNTI=1+SFN_id/4 where SFN_id is the index of the first radio frame of the specified PRACH.

In the present disclosure, the term of Tx/Rx beam correspondence is defined as follows.

In one example, Tx/Rx beam correspondence at TRP holds if at least one of the following is satisfied: TRP is able to determine a TRP Rx beam for the uplink reception based on UE's downlink measurement on TRP's one or more Tx beams; or TRP is able to determine a TRP Tx beam for the downlink transmission based on TRP's uplink measurement on TRP's one or more Rx beams. In another example, Tx/Rx beam correspondence at UE holds if at least one of the following is satisfied: a UE is able to determine a UE Tx beam for the uplink transmission based on UE's downlink measurement on UE's one or more Rx beams; or a UE is able to determine a UE Rx beam for the downlink reception based on TRP's indication based on uplink measurement on UE's one or more Tx beams.

In the present disclosure, the two terminologies, "RACH symbol" and "RACH resource" are used interchangeably. In the present disclosure, the two terminologies, "slot" and "subframe" are used interchangeably, which mean a number of consecutive OFDM symbols, e.g., 7 or 14 consecutive OFDM symbols. A RACH transmission occasion can include one or more RACH symbols/resources selected from one or more RACH chunks. One RACH chunk can be referred to as a subset of RACH resources. In some embodiments, the two terminologies, "RACH occasion," "PRACH duration" and "PRACH" are used interchangeably.

In some embodiment, a UE is configured to apply a same UE Tx beam on the selected RACH resources belonging to a same RACH chunk. In another embodiment, a UE is allowed to apply different UE Tx beams on the selected RACH resources across different RACH chunks. In yet another embodiment, one random access occasion (or a PRACH duration) consists of one or more RACH chunks and each RACH chunk consists of one or more RACH symbols. In such embodiment, a PRACH duration is an integer number of (consecutive) time slots. The number of RACH chunks in one random access occasion is Q>=1 and the number of RACH symbol in each RACH chunk is P>=1.

Figure 8A:
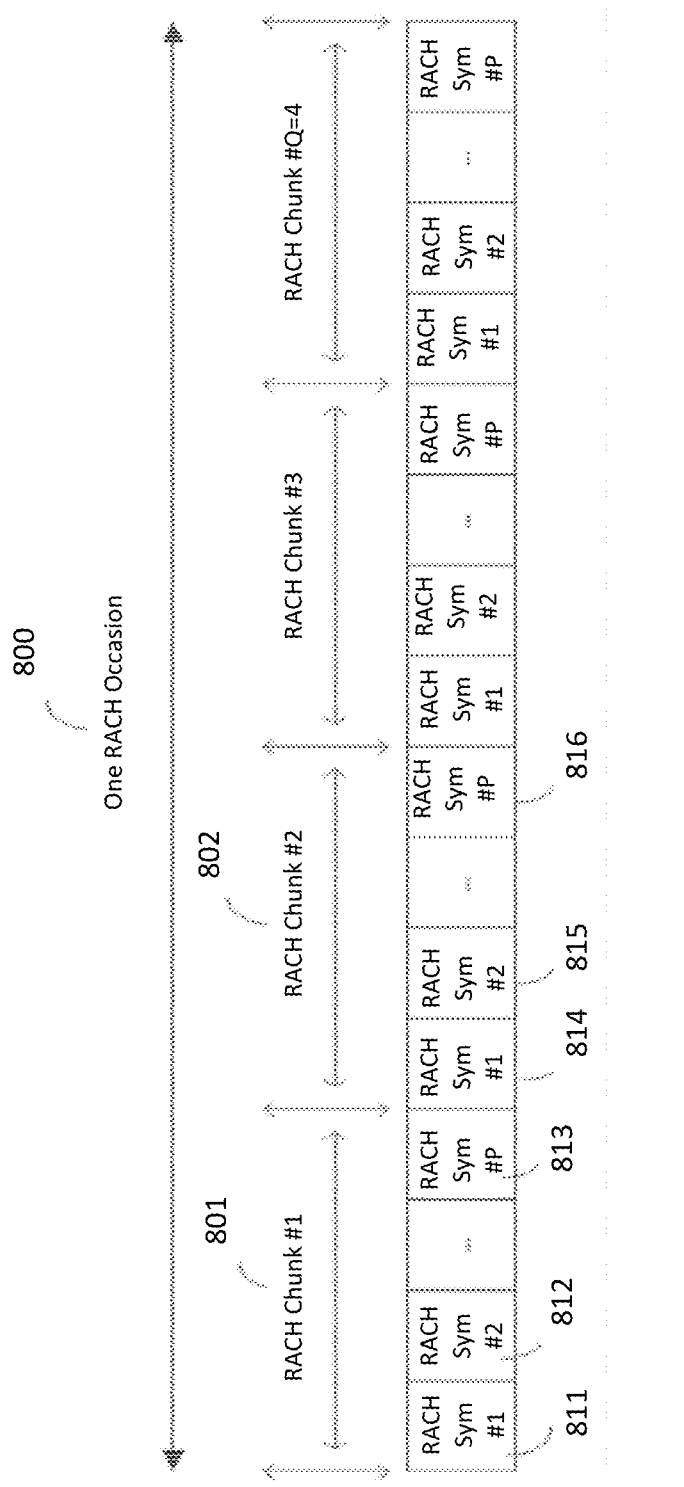
FIG. 8A illustrates an example RACH occasion according to embodiments of the present disclosure.

FIG. 8A illustrates an example RACH occasion 810 according to embodiments of the present disclosure. An embodiment of the RACH occasion 810 shown in FIG. 8A is for illustration only. One or more of the components illustrated in FIG. 8A can be implemented in specialized circuitry configured to perform the noted functions or one or more of the components can be implemented by one or more processors executing instructions to perform the noted functions. Other embodiments are used without departing from the scope of the present disclosure.

In one example, the RACH symbols in one RACH chunk are contiguous. An example is shown FIG. 8A. As illustrated in FIG. 8A, one RACH occasion 800 has Q=4 RACH chunks. Each RACH chunk has P contiguous RACH symbols. RACH chunk #1 801 has contiguous RACH symbols, RACH symbol #1 811, RACH symbol #2 812 and to RACH symbol #P 813. RACH chunk #2 802 has contiguous RACH symbols, RACH symbol #1 814, RACH symbol #2 815, and to RACH symbol #P 816.

Figure 8B:
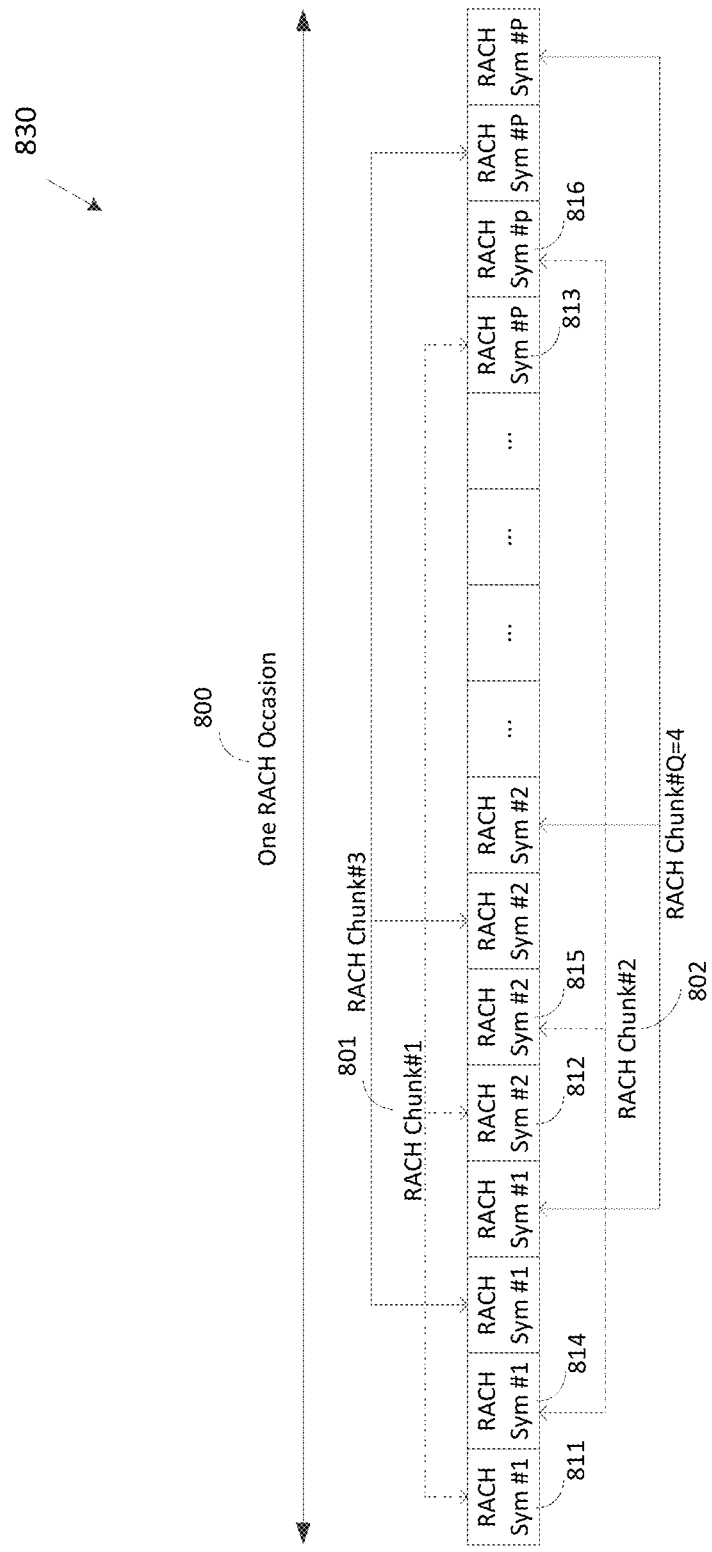
FIG. 8B illustrates another example RACH occasion according to embodiments of the present disclosure.

FIG. 8B illustrates another example RACH occasion 830 according to embodiments of the present disclosure. An embodiment of the RACH occasion 830 shown in FIG. 8B is for illustration only. One or more of the components illustrated in FIG. 8B can be implemented in specialized circuitry configured to perform the noted functions or one or more of the components can be implemented by one or more processors executing instructions to perform the noted functions. Other embodiments are used without departing from the scope of the present disclosure.

In one example, the RACH symbols in one RACH chunk are scattered/distributed. An example is shown in FIG. 8B. As illustrated in FIG. 8B, one RACH occasion 800 has Q=4 RACH chunks. Each RACH chunk has P scattered RACH symbols. RACH chunk #1 801 has scattered RACH symbols, RACH symbol #1 811, RACH symbol #2 812 and to RACH symbol #P 813. RACH chunk #2 802 has scattered RACH symbols, RACH symbol #1 814, RACH symbol #2 815, and to RACH symbol #P 816.

In some embodiments, the gNB utilizes the same receive beam on all the RACH symbols belonging to the same RACH chunk and the gNB could utilize different receive beams on different RACH chunks. In one embodiment, the gNB could sweep Rx beams over the RACH symbols within one RACH chunk.

In some embodiments, the UE is configured to use the same UE Tx beam over the RACH symbols within one RACH chunk. In one method, the UE is configured to use different UE Tx beams on the RACH symbols within one RACH chunk.

Figure 8C:
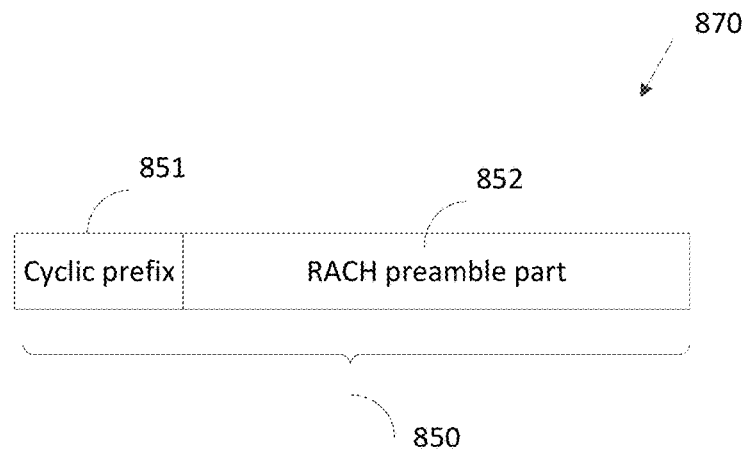
FIG. 8C illustrates an example RACH symbols according to embodiments of the present disclosure.

FIG. 8C illustrates example RACH symbols 870 according to embodiments of the present disclosure. An embodiment of the RACH symbols 870 shown in FIG. 8C is for illustration only. One or more of the components illustrated in FIG. 8C can be implemented in specialized circuitry configured to perform the noted functions or one or more of the components can be implemented by one or more processors executing instructions to perform the noted functions. Other embodiments are used without departing from the scope of the present disclosure.

In some embodiments, one RACH symbols is comprised by a cyclic prefix part and preamble sequence part, as illustrated in FIG. 8C. One RACH symbol 850 contains a cyclic prefix part 851 and a RACH preamble part 852. The length of cyclic prefix part 851 may be long enough to accommodate variation of round trip delay and propagation delay of all UEs in one cell.

In some embodiments, the UE is configured to select one RACH chunk for the uplink preamble transmission based on the measurement of downlink initial access signal. For example, the UE is configured to pick the RACH chunk index based on the index of OFDM symbol where the UE measures the strongest RSRP of initial synchronization signals. For example, the UE is configured to pick the RACH chunk index based on the index of OFDM symbol where the UE measures the strongest RSRP of beam reference signal. For example, the UE is configured to pick the RACH chunk index based on the beam ID witch which the UE measures the strongest RSRP of the beams.

In some embodiments, the UE is configured to transmit the same preamble sequence in the RACH symbols in the one selected RACH chunks.

Figure 9A:
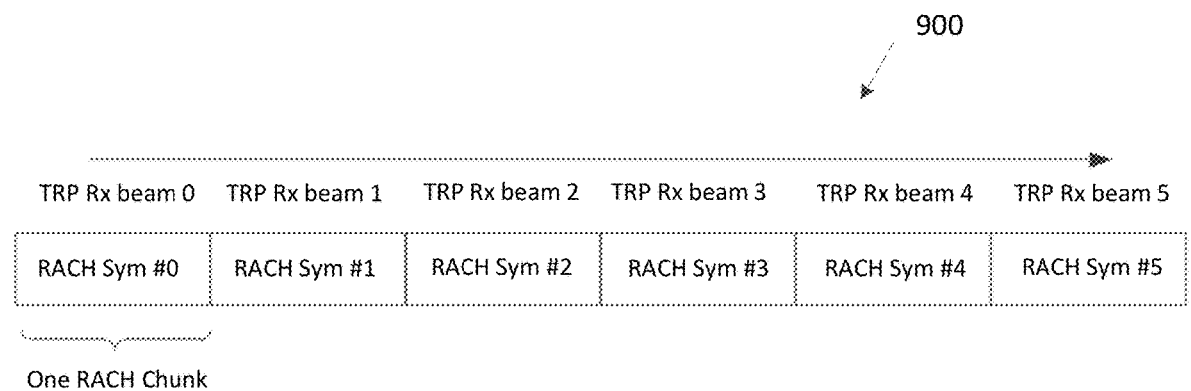
FIG. 9A illustrates an example RACH channel structure according to embodiments of the present disclosure.

FIG. 9A illustrates an example RACH channel structure 900 according to embodiments of the present disclosure. An embodiment of the RACH channel structure 900 shown in FIG. 9A is for illustration only. One or more of the components illustrated in FIG. 9A can be implemented in specialized circuitry configured to perform the noted functions or one or more of the components can be implemented by one or more processors executing instructions to perform the noted functions. Other embodiments are used without departing from the scope of the present disclosure.

As shown in FIG. 9A, one RACH occasion has Q=6 RACH chunks and each RACH chunk has P=1 RACH symbols. The TRP has 6 receive beams and the TRP sweeps the receive beams over these 6 RACH symbols. The UE is configured to transmit preamble on one of these RACH symbol. The configuration of this example is applicable to the scenario in which the TRP has beam reciprocity between Tx and Rx beams. The UE is capable to calculate the best receive beam of TRP for uplink preamble and thus is capable to pick the best RACH symbol.

Figure 9B:
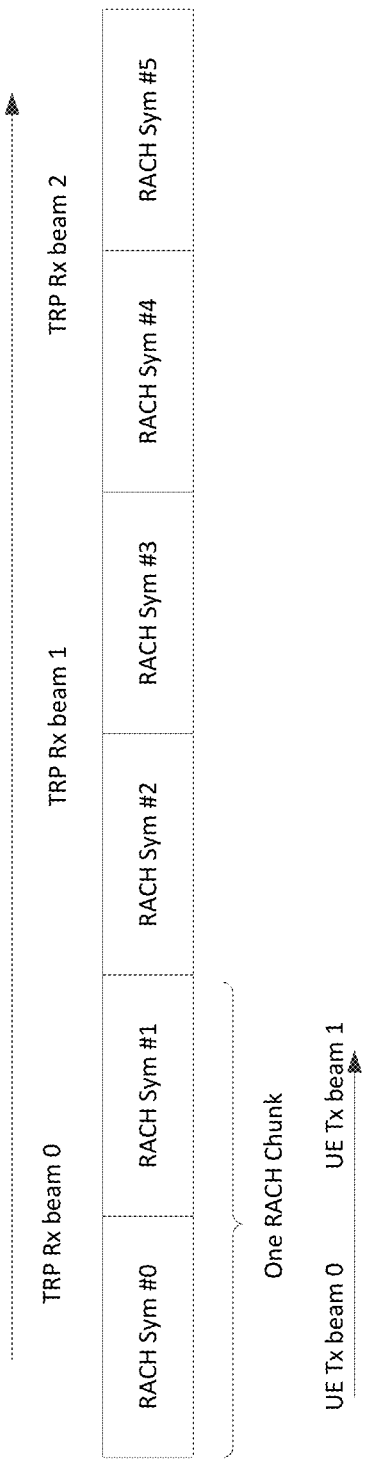
FIG. 9B illustrates another example RACH channel structure according to embodiments of the present disclosure.

FIG. 9B illustrates another example RACH channel structure 920 according to embodiments of the present disclosure. An embodiment of the RACH channel structure 920 shown in FIG. 9B is for illustration only. One or more of the components illustrated in FIG. 9B can be implemented in specialized circuitry configured to perform the noted functions or one or more of the components can be implemented by one or more processors executing instructions to perform the noted functions. Other embodiments are used without departing from the scope of the present disclosure.

As shown in FIG. 9B, one RACH occasion has Q=3 RACH chunks and each RACH chunk has P=2 RACH symbols. The symbols in one RACH chunk are contiguous. The TRP has 3 receive beams and the TRP sweeps the receive beams over these 3 RACH symbols. The TRP utilizes Rx beam #0 on both RACH symbols in RACH chunk #1; the TRP utilizes Rx beam #1 on both RACH symbols in RACH chunk #2; and the TRP utilizes Rx beam #2 on both RACH symbols in RACH chunk #3. The UE is configured to transmit preamble on one of these RACH chunk and repeat the same preamble sequence of two RACH symbols in the selected RACH chunk. The configuration as shown in FIG. 9B allows the UE to use Tx beam sweeping method to transmit uplink preamble sequence. That is applicable to the scenario in which the UE does not have beam reciprocity between Tx and Rx beams. The UE is capable to sweep Tx beams on preamble sequence to improve the uplink reliability.

Figure 9C:
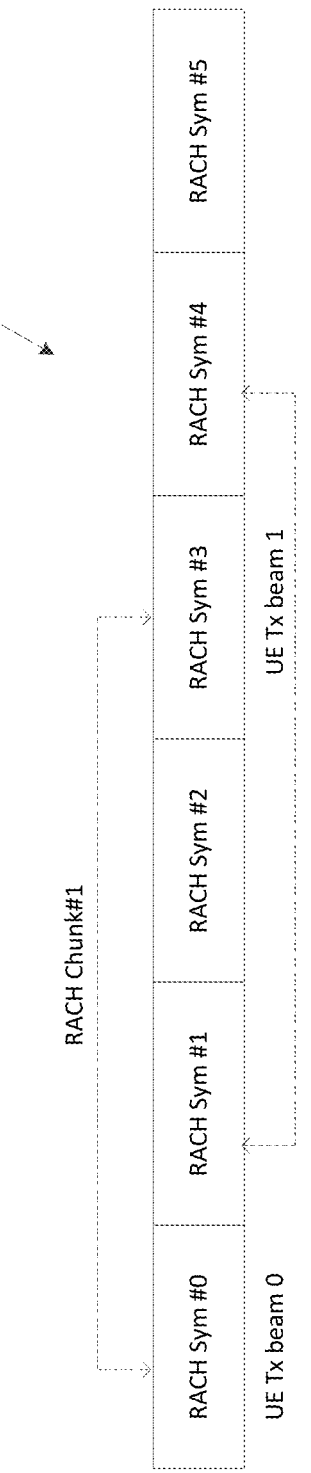
FIG. 9C illustrates yet another example RACH channel structure according to embodiments of the present disclosure.

FIG. 9C illustrates yet another example RACH channel structure 940 according to embodiments of the present disclosure. An embodiment of the RACH channel structure 940 shown in FIG. 9C is for illustration only. One or more of the components illustrated in FIG. 9C can be implemented in specialized circuitry configured to perform the noted functions or one or more of the components can be implemented by one or more processors executing instructions to perform the noted functions. Other embodiments are used without departing from the scope of the present disclosure.

An example of RACH channel configuration with scattered symbols is shown in FIG. 9C. As shown in FIG. 9C, one RACH occasion has Q=3 RACH chunks and each RACH chunk has P=2 RACH symbols. The symbols in one RACH chunk are scattered. Similar to the aforementioned embodiments, one UE is configured to transmit the same preamble sequence in two RACH symbols with different Tx beams. The scattered RACH symbols give more channel diversity to improve the reliability of uplink preamble transmission.

In some embodiments, one RACH occasion could occupy one or more uplink subframes. In such embodiments, the RACH occasion is periodic. In some embodiments, the UE can be configured to select RACH symbols for preamble transmission, according to one of the following methods. In one example, randomly select one RACH symbol in a selected RACH chunk. The random function may be such that each of the RACH symbols in the selected RACH chunk can be chosen with equal probability. In another example, select all the RACH symbols in a selected subset of RACH chunks in a PRACH duration. The size of the selected subset can be 1, 2, . . . , which can be configured via broadcast signaling or pre-configured (i.e., fixed in the specification). Which method for the UE to use can be configured via broadcast signaling, or pre-configured (i.e., fixed in the specification).

In some embodiment, one RACH occasion could occupy one or more uplink subframes. The RACH occasion is periodic. In some embodiment, the UE is configured to receive the RACH configuration from system information message, for example, MIB and SIB.

In some embodiment, the RACH configuration comprises one or more of components. In one example, the RACH configuration comprises a preamble format that defines the format of one RACH symbol. In one example, one preamble format defines the length of cyclic prefix and the length of RACH symbol. In another example, the RACH configuration comprises a preamble type that defines if a Tx beam ID is conveyed in the preamble sequence or not. In one example, if the preamble type is 0, the preamble sequence does not convey the information of Tx beam ID and if the preamble type is 1, the preamble sequence coveys the information of Tx beam ID. If a UE is configured with preamble type 1, the preamble sequences are divided into M exclusive groups and each preamble group corresponds to a TRP Tx beam ID. The UE is configured to select from preamble sequence from the group that is mapped to the TRP Tx beam the UE selects.

In yet another example, the RACH configuration comprise a number of RACH Chunk in one RACH occasion, Q>=1. In another example, the RACH configuration comprises a number of RACH symbol in one RACH chunk, P>=1. In another example, the RACH configuration comprises a type of RACH chunk: the RACH chunk could have two methods of the RACH symbols. One method is the RACH symbols are contiguous in one RACH chunk, as shown in FIG. 8A. Another method is that RACH symbols are scattered as shown in FIG. 8B.

In yet another example, following preamble transmission method is used to indicate a UE. In one instance, the UE transmits a same preamble sequence on all the RACH symbols in a selected RACH chunk. In another instance, the UE transmits a same preamble sequence on a randomly selected RACH symbol in a selected RACH chunk. In yet another instance, the UE transmits different (random) preamble sequences on the selected RACH symbols in a selected RACH chunk.

In yet another example, following UE Tx beam sweeping is used to indicate a UE. In one instance, the UE can use the same Tx beam on different RACH symbols (or RACH resources) in one RACH chunk. In another instance, the UE can use different Tx beams on different RACH symbols (or RACH resources) in one RACH chunk.

In yet another example, the RACH configuration comprises a method of selecting RACH chunk for preamble retransmission: one RACH occasion could have multiple RACH chunk and the TRP could apply different uplink Rx beams over those RACH chunks. If the TRP does not have reciprocity between Tx and Rx beams, the UE may be not able to figure out which Rx beam (i.e., RACH chunk) is the best for preamble transmission. So if a preamble transmission is failed, the UE could be configured to re-select the RACH chunk for the preamble re-transmission. Multiple modes could be defined. In one example, one mode is that the UE is configured to use the same RACH chunk. In one example, the UE is configured to select the next RACH chunk index based on the previous RACH chunk index by following some equation. In one example, the UE is configured to select the RACH chunk index based on a pseudorandom sequence. The pseudorandom sequence could be generated from the initialization based on the identity of the UE.

In yet another example of time and frequency resource configuration, the subframe configuration of RACH occasions comprises the indices of subframe where RACH occasions/durations are mapped and the periodicity of RACH occasions.

In yet another example of the RAR type, there could be type of methods to transmit RAR. In one instance, one Tx beam is transmitted. In another instance, RAR is transmitted through a Tx beam sweeping. In such example, if the RAR type is 0, the RAR is sent as a PDSCH indicated by a DCI with RA-RNTI. In such example, RA-RNTI can be a function of RACH chunk index. RA-RNTI can be function of RACH chunk index and RACH symbol index within one RACH chunk (e.g., two RA-RNTI calculation scheme). In such example, if the RAR type is 1, the RAR is sent through Tx beam sweeping and the configuration of RAR occasion is conveyed in system information channel.

In some embodiments, the UE is configured to determine a method of transmitting RACH preamble based on UE's capability. In one example, if the UE is with beam correspondence, the UE chooses the method transmitting RACH preamble on a randomly selected RACH symbol within a selected RACH chunk. In another example, if the UE is without beam correspondence, the UE chooses the method of transmitting PRACH preamble on all the RACH symbols in a selected RACH chunk. The UE can be further configured with two sets of RACH chunks in a PRACH duration, for example, a first set to be used by the UE with beam correspondence to select one RACH resource in a RACH chunk and a second set to be used by the UE without beam correspondence to select all the RACH resources in a RACH chunk.

In yet another example, the RACH configuration comprises the subframe configuration of RACH occasions comprising the information indices of subframe where RACH occasions are mapped and the periodicity of RACH occasions. In yet another example, the RACH configuration comprises the RAR type: there could be type of methods to transmit RAR. One method is to transmit with one Tx beam. Another method is to transmit RAR through a Tx beam sweeping. In one example, if the RAR type is 0, the RAR is sent as a PDSCH indicated by a DCI with RA-RNTI. If the RAR type is 1, the RAR is sent through Tx beam sweeping and the configuration of RAR occasion is conveyed in system information channel.

In some embodiments, the RACH configuration could be configured by RACH configuration index and the RACH configuration index is signaled in system information channel, e.g., MIB (PBCH) and/or SIB (PBCH2). The UE is configured to calculate the RACH configuration information, for example, the detailed information listed above, based on the received RACH configuration index. One example of the RACH configuration index is shown in TABLE 2A and 2B.

TABLE 2A

| RACH configuration index | | | | | |
|---|---|---|---|---|---|
| RACH config- uration index | Preamble format | Preamble type | Number of RACH chunk (Q) | Number of RACH symbols per Chunk (P) | Method of selecting RACH chunk for re-trans- mission |
| 0 | 0 | 0 | 7 | 1 | 0 |
| 1 | 0 | 0 | 7 | 4 | 0 |
| 2 | 0 | 1 | 7 | 1 | 1 |
| 3 | 0 | 1 | 7 | 4 | 1 |
| 4 | 0 | 0 | 7 | 4 | 1 |
| 5 | 0 | 0 | 7 | 4 | 2 |
| 6 | 1 | 0 | 7 | 1 | 0 |
| 7 | 1 | 0 | 7 | 1 | 0 |

TABLE 2B

| RACH configuration index | | | | |
|---|---|---|---|---|
| Time and frequency resource index | Preamble Transmit method | UE Tx beam sweeping method | RACH Chunk Type | RAR type |
| Index of slots | 1 | 0 | 0 | 0 |
| Index of slots | 1 | 0 | 0 | 0 |
| Index of slots | 1 | 0 | 0 | 0 |
| Index of slots | 2 | 0 | 0 | 0 |
| Index of slots | 2 | 1 | 1 | 1 |
| Index of slots | 2 | 1 | 1 | 1 |
| Index of slots | 2 | 0 | 0 | 1 |
| Index of slots | 2 | 1 | 1 | 1 |

As shown in TABLE 2A and 2B, one example of RACH configuration index 0 defines: preamble format is 0; preamble type is 0, i.e., the preamble sequence does not convey Tx beam ID; each RACH occasion has Q=7 RACH chunk and each RACH chunk has P=1 RACH symbol; and the RACH symbols are contiguous in each RACH chunk.

As shown in TABLE 2A and 2B, one example of RACH configuration index 3 defines: preamble format is 0; preamble type is 1. The preamble sequence may convey one Tx beam ID; each RACH occasion has Q=7 RACH chunks and each RACH chunk has P=4 RACH symbols; and the RACH symbols are contiguous in each RACH chunk.

In some embodiments, the gNB can indicate more than one, e.g., RACH configuration indices and the UE is configured to select one of those configured RACH configuration indices for the RACH procedure.

In one embodiment, a gNB configures two RACH configurations. In a first RACH configuration according to a first RACH configuration index, each RACH chunk has P=1 RACH symbols. In a second RACH configuration according to a second RACH configuration index, each RACH chunk has P>1 RACH symbols. The UE is configured to select one of those two RACH configurations based on UE's beam correspondence capability. The UE with Tx/Rx beam correspondence can choose the first RACH configuration and the UE without Tx/Rx beam correspondence or with partial Tx/Rx beam correspondence can choose the second RACH configuration.

In one embodiment, two different RACH configuration indices can be configured to the UE through system information. These two RACH configuration indices can configure different sets of RACH resources or RACH chunks. The UE is configured to choose from one of these two configured RACH configurations and then transmit the RACH preamble on the RACH resources configured based on the selected RACH configuration index.

In one embodiment, one RACH configuration index is used to configure two PRACHs or PRACH durations. An example is shown in TABLE 2C. The UE is configured to calculate the PRACH configuration(s) based on the RACH configuration index received in system information. As shown in TABLE 2C, for each RACH configuration index, the information can include following parameters. In one example, the information may include the number of PRACH configurations, $N_{PRACH}$. In one example, the information may include the common parameters for all $N_{PRACH}$ PRACH configurations: the information can include the information of slot index for PRACH if the RACH resources of these two RACN configuration are overlapped in the same time and frequency resource; the information can include the PRACH preamble formant and PRACH preamble type; and the information can include the number of RACH chunks and the number of symbols in one RACH chunk.

In one example, the information may include the unique parameters for a first PRACH configuration: the information can include the RAR type information for a first PRACH configuration, for example, the RA-RNTI calculation method and RAR window configuration; the information can include the RACH preamble transmit method; and the information can include the UE Tx beam sweeping method.

In one example, the information may include the unique parameters for a second PRACH configurations: the information can include the RAR type information for a second RPACH configuration, for example, the RA-RNTI calculation method and RAR window configuration; the information can include the RACH preamble transmit method; and the information can include the UE Tx beam sweeping method.

The UE is configured to calculate the configuration of each PRACH configured by the RACH configuration index based on the common parameters and unique parameters.

TABLE 2C

| RACH configuration | | | | | |
|---|---|---|---|---|---|
| RACH configuration index | Number of PRACH configurations | Common parameters for all PRACH configurations | Parameters for a first PRACH configuration | Parameters for a second PRACH configuration | ... |
| 0 | 1 | Common configuration for all 1 PRACH configurations: common configuration can include slot index of PRACH, preamble type, number of RACH | Parameters for a first PRACH configuration. Parameters can include the preamble transmit method, RA-RNTI calculation method, RAR windowing, UE | — | — | |

TABLE 2C-continued

RACH configuration

| RACH configuration index | Number of PRACH configurations | Common parameters for all PRACH configurations | Parameters for a first PRACH configuration | Parameters for a second PRACH configuration | ... |
|---|---|---|---|---|---|
| | | chunks and RACH symbols | Tx beam sweeping | | |
| 1 | 2 | Common configuration for all 2 PRACH configurations: common configuration can include slot index of PRACH, preamble type, number of RACH chunks and RACH symbols | Parameters for a first PRACH configuration. Parameters can include the preamble transmit method, RA-RNTI calculation method, RAR windowing, UE Tx beam sweeping | Parameters for a second PRACH configuration. Parameters can include the preamble transmit method, RA-RNTI calculation method, RAR windowing, UE Tx beam sweeping | — |
| ... | ... | ... | ... | ... | ... |

In some embodiments, the UE can be configured to do the following for the PRACH retransmissions. In one example, the UE increases the Tx power for the preamble transmission by the step size $\Delta_P$. The can be configured by the gNB. In another example, RACH chunk selection: the UE can keep the same the RACH chunk or select a different RACH chunk for the preamble retransmission. In yet another example, the UE switch the UE Tx beam(s) used for RACH preamble transmission in the preamble retransmission.

In some embodiments, the UE can be configured with the one or more UE behavior configurations that can include the Tx power ramping, RACH chunk selection/reselection and UE switching UE Tx beam, for preamble retransmission. The UE is configured to select one of those configurations based on the UE's beam correspondence capability.

In some embodiments, the UE can be configured to first use Tx power ramping and then RACH chunk selection in case of preamble retransmission. In one method, in case of preamble retransmission, the UE increases the Tx power for preamble $1^{st}$ transmission, $2^{nd}$ retransmission until n-th retransmission. If the preamble n-th retransmission still failed, the UE is configured to switch to another RACH chunk and use this new RACH chunk for the n+1-th retransmission until 2n-th retransmission, during which the UE is configured to increase the Tx power with $\Delta_P$ for every new retransmission.

In some embodiments, the UE can be configured to first use RACH chunk selection and then use Tx power ramping in case of preamble retransmission. In one method, in case of preamble retransmission, the UE reselects the RACH chunk for preamble $1^{st}$ transmission, $2^{nd}$ retransmission until n-th retransmission but with the same Tx power. If the preamble n-th retransmission still failed, the UE is configured to increase the Tx power by $\Delta_P$ and use a new Tx power for the n+1-th retransmission until 2n-th retransmission, during which the UE is configured to reselect the RACH chunk for every new retransmission.

In some embodiments, the UE can be configured to use RACH chunk selection and Tx power ramping simultaneously. In one method, the UE uses Tx power $P_{Tx0}$ and RACH chunk $i_0$ for the initial preamble transmission. If no corresponding RAR is received, the UE transmit the RACH preamble with Tx power $P_{Tx0}+\Delta_P$ and a new RACH chunk ii based on the RACH chunk reselection method configured by the gNB.

In some embodiments, the UE can be configured with one or more Tx beam switching methods and the UE is configured to select the Tx beam switching method based on its beamforming capability and beam correspondence capability. In one method, in the case of the UE has beam correspondence, the UE can choose not using Tx beam switching and the Tx beam used for preamble transmission can be the best beam learning based on the measurement of DL initial access signals. In another method, in the case of the UE without Tx beamforming capability, the UE can choose not using Tx beam switching for the preamble retransmission.

In some embodiments, the UE is configured to select the preamble sequence based on the preamble type indicated by the RACH configuration. In one embodiment, the preamble type is indicated by a RACH configuration index that is signaled in system information message.

In some embodiments, assume the UE is configured with L available preamble sequence for random access. The UE is also configured with number of Tx beams used for DL initial access signals, $N_B$. If the UE is configured with preamble type 0, the UE is configured to randomly select one sequence from those L preamble sequence. If the UE is configured with preamble type 1, the UE is configured to select the preamble sequence through the following procedure. In step 1, the UE calculates the best Tx beam ID that corresponds to the strongest RSRP of DL initial signals. In one example, the initial synchronization signals are transmitted over multiple OFDM symbol through Tx beam sweeping. The best Tx beam ID is the OFDM symbol index where the UE detects the strongest RSRP of initial synchronization signals. In another example, the best Tx beam ID is the beam ID with the strongest RSRP measured from beam reference signals.

In step 2, assume the Tx beam ID selected by the UE is $n \in [0, 1, \ldots, N_B-1]$. In this step, in one embodiment, the UE to select the preamble sequence from preamble ID set $[0, \ldots, L-1]$ is given as follows. In one example for the case of $\mathrm{mod}(L, N_B) > 0$, if the Tx beam ID is $n \in [0, \ldots, \mathrm{mod}(L, N_B)-1]$, the UE uniformly and randomly selects one preamble sequence from sequence ID set:

$$\left[0, 1, \cdots, \left\lfloor \frac{L}{N_B} \right\rfloor\right] + n \times \left(\left\lfloor \frac{L}{N_B} \right\rfloor + 1\right).$$

If the Tx beam ID is $n \in [\mathrm{mod}(L, N_B), \ldots, N_B-1]$, the UE uniformly and randomly selects one preamble sequence from sequence ID set:

$$\left[0, 1, \cdots, \left\lfloor \frac{L}{N_B} \right\rfloor - 1\right] +$$

$$(n - \mathrm{mod}(L, N_B)) \times \left(\left\lfloor \frac{L}{N_B} \right\rfloor\right) + \left\lfloor \frac{L}{N_B} \right\rfloor \times (\mathrm{mod}(L, N_B) + 1).$$

In another example for the case of mod (L, $N_B$)==0, For the Tx beam ID: n ∈ [0, . . . , $N_B$−1], the UE uniformly and randomly selects one preamble sequence from sequence ID set:

$$\left[0, 1, \cdots, \left\lfloor \frac{L}{N_B} \right\rfloor - 1\right] + n \times \left\lfloor \frac{L}{N_B} \right\rfloor.$$

In another embodiment, the UE to select the preamble sequence from preamble ID set [0, . . . , L−1] is given as follows. In one example for the Tx beam ID: n ∈ [0, . . . , $N_B$−1], the UE selects one preamble sequence from preamble sequence IDs that satisfy the condition: l=n+$N_B$×i; with i=0, 1, 2, . . . , l≥0 and l≤L.

In one embodiment, the preamble ID set is [$L_0$, $L_0$+1, . . . , $L_0$+L−1], the preamble sequence ID the UE selects would be $\hat{L} = L_0 + \hat{L}$, where $\hat{L}$ is the preamble ID calculated using the aforementioned embodiments.

In some embodiments, the UE is configured to repeat the selected preamble sequence in multiple RACH symbols in one RACH chunk. In some embodiment, a UE is configured with a method of switching RACH chunk. The method defines the procedure on how the UE selects the RACH chunk for the random access preamble sequence re-transmission when one preamble sequence transmission is failed. In some embodiment, the method of switching RACH chunk is signaled through RACH configuration index.

In some embodiments, the RACH resource index can be associated with the TRP Tx beam ID. The UE is configured to select the RACH resource index for preamble transmission based on the UE's determination of TRP Tx beam ID.

In some embodiments, a UE is configured with a method of switching RACH chunk. The method defines the procedure on how the UE selects the RACH chunk for the random access preamble sequence re-transmission when one preamble sequence transmission is failed. In some embodiments, the method of switching RACH chunk is signaled through RACH configuration index.

Assume there are totally Q>=1 RACH Chunks in one RACH occasion and the RACH chunk index is [0, 1, . . . , Q−1]. Assume the RACH chunk index selected first transmission of preamble is $q_0$. In one embodiment, the index of RACH chunk for first preamble retransmission is ($q_0$+1) (mod Q) and the index of RACH chunk for n-th preamble retransmission is ($q_0$+n) (mod Q). In another embodiment, the index of RACH chunk for first preamble retransmission is ($q_0$−1) (mod Q) and the index of RACH chunk for n-th preamble retransmission is ($q_0$−n) (mod Q). In yet another embodiment, the index of RACH chunk for first preamble retransmission is ($q_0$−1) (mod Q) and the index of RACH chunk for second preamble retransmission is ($q_0$+1) (mod Q).

Figure 10A:
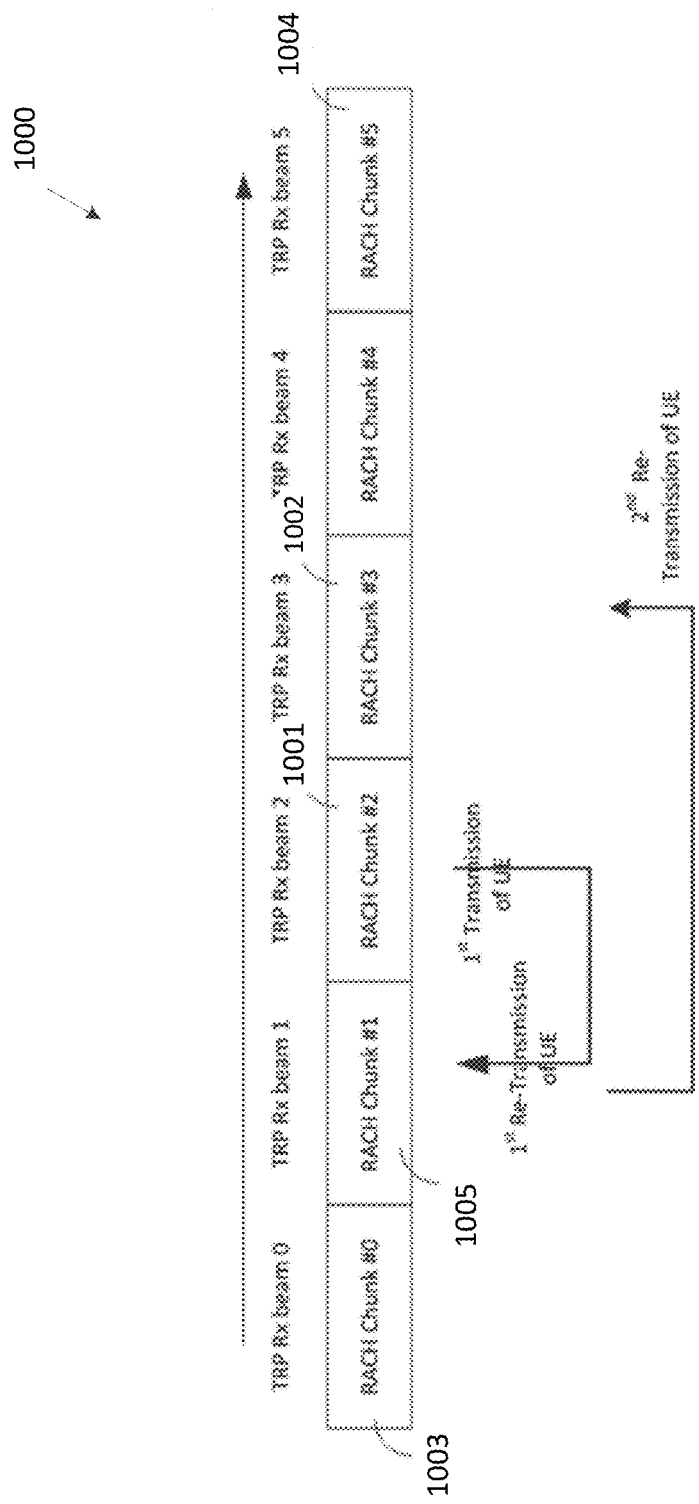
FIG. 10A illustrates an example RACH chunk according to embodiments of the present disclosure.

FIG. 10A illustrates an example RACH chunk 1000 according to embodiments of the present disclosure. An embodiment of the RACH chunk 1000 shown in FIG. 10A is for illustration only. One or more of the components illustrated in FIG. 10A can be implemented in specialized circuitry configured to perform the noted functions or one or more of the components can be implemented by one or more processors executing instructions to perform the noted functions. Other embodiments are used without departing from the scope of the present disclosure.

The index of RACH chunk for n-th preamble retransmission is $$\left(q_0 + (-1)^n \left\lceil \frac{n-1}{2} \right\rceil\right) (\mathrm{mod}\, Q),$$

for n=1, 2, . . . . An example for this method is shown in FIG. 10A. As illustrated in FIG. 10A, here are Q=6 RACH chunks. The UE selects RACH chunk #2 1001 for the initial preamble transmission. Then the index of RACH chunk for first retransmission is (2−1) (mod 6)=1, that is RACH chunk #1 1005. The index of RACH chunk for second retransmission is $$\left(2 + (-1)^{-2} \left\lceil \frac{2-1}{2} \right\rceil\right) (\mathrm{mod}\, 6) = 3,$$

which is RACH chunk #3, 1002.

In one embodiment, the index of RACH chunk for first preamble retransmission is ($q_0$+1) (mod Q) and the index of RACH chunk for second preamble retransmission is ($q_0$−1) (mod Q). The index of RACH chunk for n-th preamble retransmission is $$\left(q_0 - (-1)^n \left\lceil \frac{n-1}{2} \right\rceil\right) (\mathrm{mod}\, Q),$$

for n=1, 2, . . . .

Figure 10B:
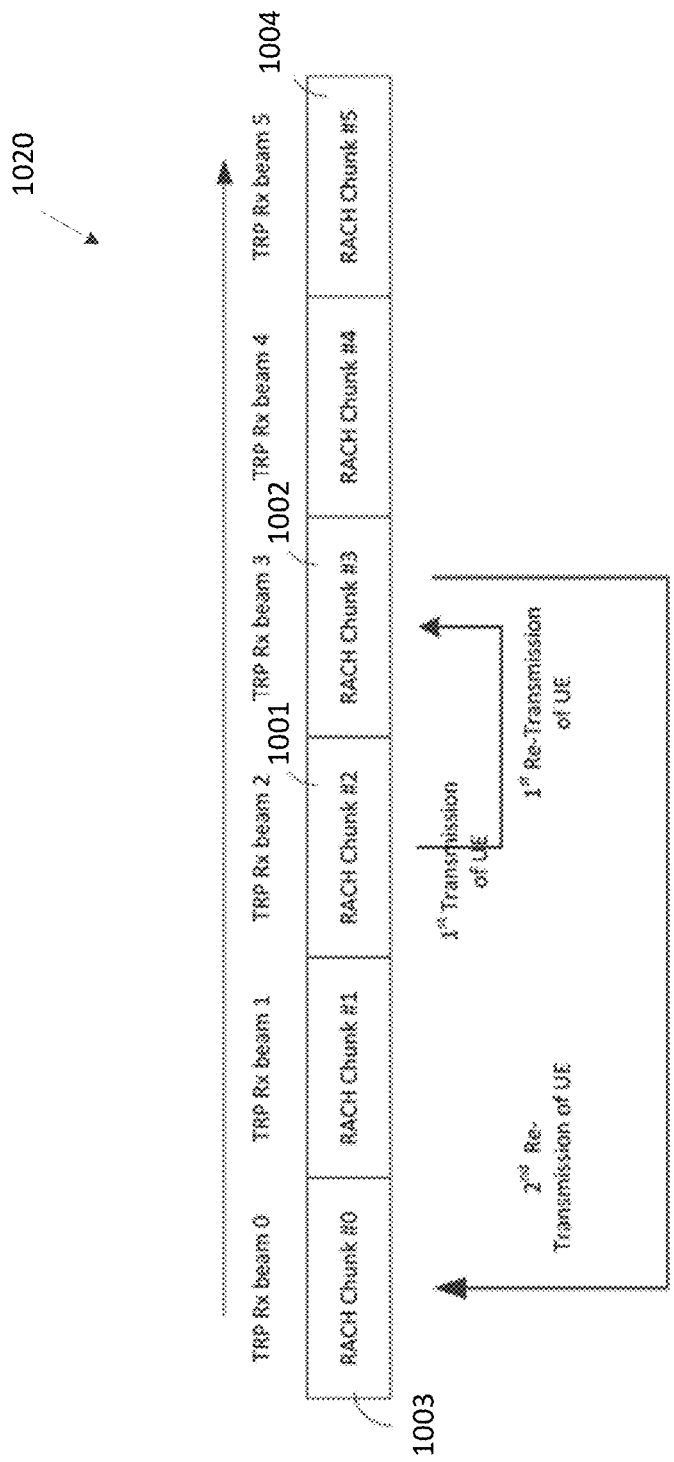
FIG. 10B illustrates another example RACH chunk according to embodiments of the present disclosure.

FIG. 10B illustrates another example RACH chunk 1020 according to embodiments of the present disclosure. An embodiment of the RACH chunk 1020 shown in FIG. 10B is for illustration only. One or more of the components illustrated in FIG. 10B can be implemented in specialized circuitry configured to perform the noted functions or one or more of the components can be implemented by one or more processors executing instructions to perform the noted functions. Other embodiments are used without departing from the scope of the present disclosure.

In some embodiments, the index of RACH chunk for first preamble retransmission is ($q_0$+1) (mod Q) and the index of RACH chunk for second preamble retransmission is ($q_0$−2) (mod Q). The index of RACH chunk for n-th preamble retransmission is ($q_0$−(−1)$^n$×n) (mod Q), for n=1, 2, . . . . An example for this method is shown in FIG. 10B. As illustrated in FIG. 10B, there are Q=6 RACH chunks. The UE selects RACH chunk #2 1001 for the initial preamble transmission. Then the index of RACH chunk for first retransmission is (2+1) (mod 6)=3, that is RACH chunk #2 1001. The index of RACH chunk for second retransmission is (2−2) (mod 6)=0, which is RACH chunk #0, 1003.

In one embodiment, the index of RACH chunk for first preamble retransmission is ($q_0$−1) (mod Q) and the index of RACH chunk for second preamble retransmission is ($q_0$+2) (mod Q). The index of RACH chunk for n-th preamble retransmission is ($q_0$+(−1)$^n$×n) (mod Q), for n=1, 2, . . . .

In some embodiments, the indices of RACH chunk for the first transmission and retransmissions {$q_0$, $q_1$, $q_2$, . . . } are generated from pseudo-random sequence. The pseudo-random sequence is generated based on initialization with UE's ID or the Tx beam ID of which the UE measures the strongest RSRP of SS and/or BRS.

In some embodiments, the indices of RACH chunk for the retransmission is $\{q_0+\Delta_0, q_0+\Delta_1, q_0+\Delta_2, \ldots\}$, where $q_0$ is the RACH chunk index the UE selects for the initial transmission of preamble and $\{\Delta_0, \Delta_1, \Delta_2, \ldots\}$ are the offset the UE used to calculate the RACH chunk index for first, second, third, ..., preamble retransmission. The $\{\Delta_0, \Delta_1, \Delta_2, \ldots\}$ is generated from pseudo-random sequence. The pseudo-random sequence is generated based on initialization with UE's ID or the Tx beam ID of which the UE measures the strongest RSRP of SS and/or BRS.

In some embodiments, a UE is configured with a method of transmitting RAR. The method of transmitting RAR can be configured through RACH configuration index.

In some embodiments, the RAR is sent in downlink allocation scheduled by the downlink control channel, e.g., PDCCH. The UE is configured to monitor the PDCCH for the RAR identified by the RA-RNTI.

In some embodiments, the RA-RNTI of PDCCH scheduling RAR transmission is associated with the RACH chunk index and/or RACH symbol index. In one example, the RA-RNTI is calculated based on a RACH chunk index. In another example, RA-RNTI is calculated based on a RACH chunk index and a RACH symbol index. The UE can be configured which method to use for RA-RNTI calculation in PRACH configuration.

In some embodiments, the UE is configured to calculate the RA-RNTI for monitoring PDCCH scheduling RAR that is associated with one preamble transmission based on the method of transmitting this RACH preamble this UE used. In one example, if the UE transmits RACH preamble on one RACH symbol in a selected RACH chunk, then the UE monitors the PDCCH for RAR based on the RA-RNTI that is calculated based at least partly based on both the index of RACH chunk and the index of RACH symbol where the RACH preamble is transmitted. If the UE transmits repeated (or multiple) RACH preamble on all the RACH symbols in a selected RACH chunk, then the UE monitors the PDCCH for RAR based on the RA-RNTI that is calculated at least partly based on the index of RACH chunk where the RACH preamble(s) is transmitted.

In some embodiments, the RA-RNTI can be calculated based on slot/subframe index of PRACH, the index of RACH chunk in one PRACH and the PRACH index within the slot/subframe or PRACH occasion. In one method (RA-RNTI method 1), the RA-RNTI is defined as RA_RNTI=$f_0(T_i, F_i, C_i)$ where $f_0$ the function of calculating RA_RNTI, $T_i$ is the index of the subframe of PRACH, $F_i$ is the index of the PRACH within that subframe and $C_i$ is the RACH chunk index within that PRACH. One example of function $f_0$ can be: RA_RNTI=$1+T_i+G \times F_i+Q \times C_i$. The value of parameters G and Q can be configured by the gNB through system information (e.g., SIB) or defined in the spec.

In some embodiments, the RA-RNTI can be calculated based on the index of RACH symbol, the index of RACH chunk, PRACH index and slot index information of PRACH. In one method (RA-RNTI method 2), the RA-RNTI is defined as RA_RNTI=$f_1(T_i, F_i, C_i, S_i)$ where $f_1$ the function of calculating RA_RNTI, $T_i$ is the index of the subframe of PRACH, $F_i$ is the index of the PRACH within that subframe and $C_i$ is the RACH chunk index within that PRACH, $S_i$ is the RACH symbol index.

In some embodiments, the UE is indicated to select which of the RA_RNTI calculation methods for monitoring the PDCCH scheduling RAR, e.g., implicitly based on the preamble transmission method the UE uses. If preamble transmission method 1 is used, then the UE uses RA-RNTI method 1; if preamble transmission method 2 is used, then the UE uses RA-RNTI method 2.

In some embodiments, the timing of one RAR window is associated with one PRACH. In one method, the timing of one RAR window is associated with the RACH chunk index within a selected PRACH. In this manner, the UE is configured to monitor and receive the RAR transmitted associated on the RACH chunk where the UE sends the preamble. One RAR window is associated with a RACH chunk index within a selected PRACH. In another method within one PRACH. In this manner, the UE is configured to monitor and receive the RAR transmission associated with the subset/group of RACH chunks where the UE sends the preamble. One RAR window is associated with a group of RACH chunk indices within a selected PRACH.

In some embodiments, the RAR can include the information of the RACH chunk and the RACH symbol indices where the preamble is detected and the information of UE Tx beam. The UE can use such information to assist the UE Tx beam selection for the transmission of RACH msg3 and other following UL transmission.

In some embodiments, a UE is configured with a method of transmitting RAR. The method of transmitting RAR can be configured through RACH configuration index.

Figure 11:
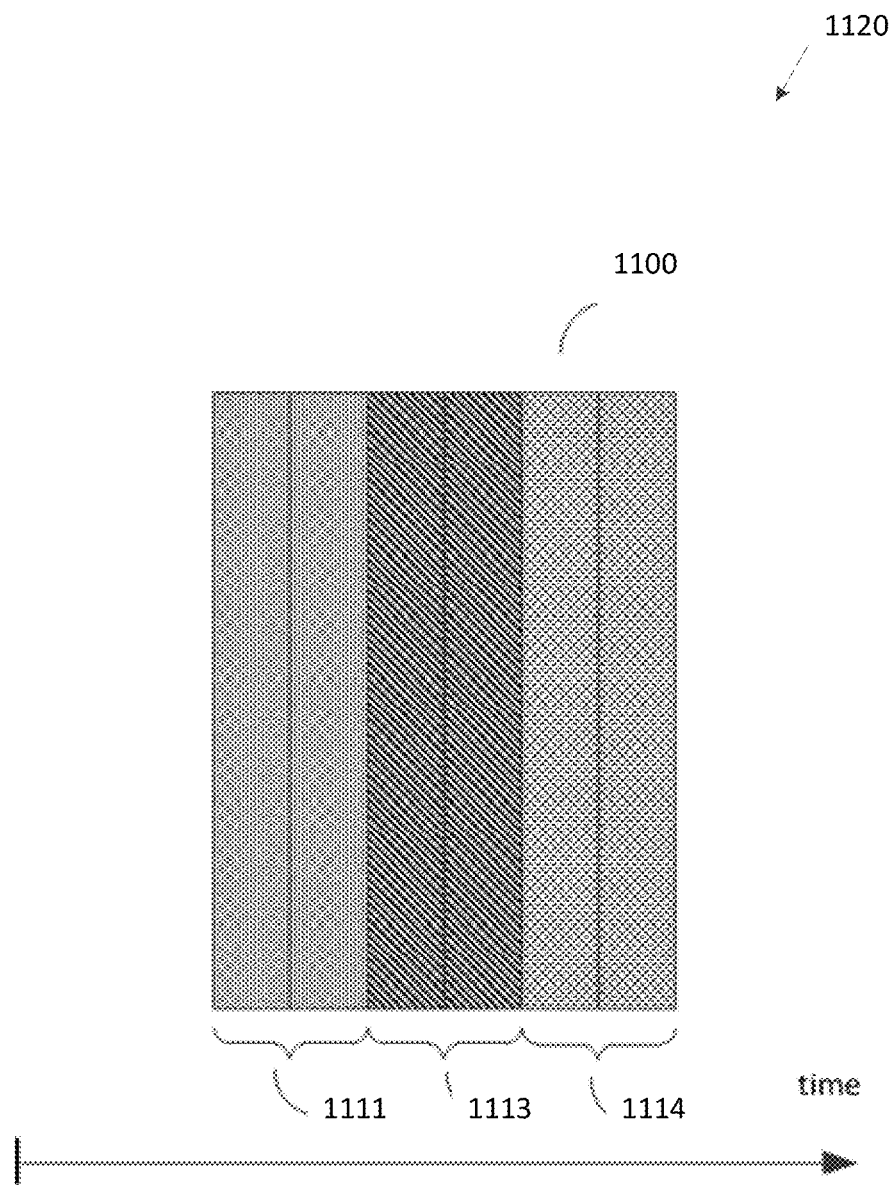
FIG. 11 illustrates an example RAR occasion according to embodiments of the present disclosure.

FIG. 11 illustrates an example RAR occasion 1120 according to embodiments of the present disclosure. An embodiment of the RAR occasion 1120 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

In some embodiments, the random access response (RAR) is sent through a Tx beam sweeping methods. In each RAR occasion, there are S×H OFDM symbols and each S contiguous OFDM symbols is one RAR chance. One or more RAR could be transmitted within one RAR chance. The gNB utilizes same Tx beam on each RAR chance and sweeps the Tx beams over multiple RAR chance. An example of RAR occasion is shown in FIG. 11.

As illustrated in FIG. 11, one RAR occasion 1100 contains three RAR chances 1111, 1112, and 1113 (e.g., RACH chances). Each RAR chance is comprised of two contiguous OFDM symbols. The gNB utilizes same Tx beam on two OFDM symbols within on RAR chance and sweeps the Tx beams over RACH chances 1111, 1112, and 1113.

In some embodiments, the RAR occasion is transmitted periodically with periodicity $T_{RAR}$. In some embodiments, a UE is configured with one or more of the following about RAR occasion transmission by the system information channel: the periodicity $T_{RAR}$ in terms of, for example, subframes, ms. The indices of subframes or time interval wherein RAR occasion may occur; number of OFDM symbols per RAR chance; number of RAR chances per RAR occasion; and the indices of OFDM symbols used for RAR, in the subframe or time interval where the RAR occasion is transmitted.

In some embodiments, the UE is configured of the information of RAR configuration through a RAR configuration index. The UE is configured to calculate the RAR configuration based on the value of RAR configuration index.

TABLE 3

RAR configuration

| RAR configuration index | Indices of subframes wherein RAR is mapped | OFDM symbol indices used for RAR | Number of RAR chances | Number of OFDM symbol in one RAR chance |
|---|---|---|---|---|
| 0 | Subset 0 of subframes | $k_0$ | $H_0$ | $S_0$ |
| 1 | Subset 1 of subframe | $k_1$ | $H_1$ | $S_1$ |

In some embodiments, the UE is configured to receive the UE-specific configuration of reference signal for the beam measurement in RACH msg4. The reference signal can be called CSI-RS, BRS (beam RS), MRS (measurement/mobility RS). The term BRS may be used for the reference signal, which does not exclude that the reference signal could be called by other terms.

The UE-specific configuration of BRS for the beam measurement transmitted in RACH msg4 includes one or more of the followings. In one example, the UE-specific configuration comprises number of OFDM symbols and number of antenna ports in the BRS. In such example, the number of OFDM symbols to map the BRS is explicitly indicated in the configuration. The number of antenna port is explicitly indicated in the configuration. In one instance, a 2-bit field is used to indicate the number of OFDM symbols. Four values of the 2-bit field indicate four different values of the number of OFDM symbols. In one instance, a 2-bit field is used to indicate the number of antenna ports. Four values of the 2-bit field indicate four different values of the number of antenna ports.

In another example, the UE-specific configuration comprises the beam ID configuration. In such example, the allocation of beam IDs to the OFDM symbols and/or antenna ports of the BRS are configured here. In one example, one beam ID is allocated to per antenna port per OFDM symbol. In one instance, one beam ID is allocated per OFDM symbol.

In yet another example, the UE-specific configuration comprises the beam grouping configuration for constrained measurement. In such example, the gNB configures the beam IDs into $N_g$ beam groups and the UE is configured to make a constrained measurement on the beams. In such example, the beam grouping is configured through OFDM symbol index. In one instance, the beam grouping is configured through BRS antenna port index. In one instance, the beam grouping is configured through OFDM symbol index and antenna port index.

In yet another example, the UE-specific configuration comprises beam cluster configuration. In such example, the gNB could configure $N_c$ beam clusters and the UE is configured to measure beam-cluster-specific RSRP. In one instance, the beam cluster configuration is in terms of reference signal OFDM symbol index. In one instance, the beam cluster configuration is in terms of antenna ports. In one example, the beam cluster configuration is in terms of BRS resource.

In yet another example, the UE-specific configuration comprises an RSRP calculation method. In such example, the UE is configured to measure beam-specific RSRP and cell-specific RSRP. In one instance, a 2-bit is used to indicate which RSRP(s) may be measured by the UE. In one instance, a 2-bit is used to indicate the method of calculating the cell-specific RSRP.

In some embodiments, procedure of the initial random access procedure is as following. In step 1, the UE receives the RACH configuration from the system information channel. In step 2, based on the preamble type configuration in RACH configuration, the UE selects one preamble sequence: if preamble type is 0, the UE selects the preamble sequence without conveying Tx beam ID; and if preamble type is 1, the UE is configured to obtain the configuration information of mapping Tx beam ID to preamble sequence ID and then select one preamble sequence ID based on this configuration and the Tx beam ID that corresponding to the strongest RSRP of downlink SS and/or BRS signal.

In step 3, the UE selects one RACH chunk based on the RACH configuration. One example is that RACH configuration defines a mapping between RACH chunk and downlink OFDM symbols wherein the SS/PBCH/BRS are mapped, and the UE selects RACH chunk corresponding to the downlink OFDM symbol where the UE measures the strongest RSRP of SS and/or BRS.

In step 4, the UE transmits the preamble sequence on the selected RACH chunk. Based on the RACH configuration, the UE could do Tx beam sweeping on the RACH symbols in the selected RACH chunk.

In step 5, if the preamble transmission is failed, the UE select the RACH chunk for the retransmission based on the RACH configuration as follows. The UE re-transmit the preamble sequence on the selected RACH chunk with Tx power being increased with a configured step-size. In one example, if the mode of switch RACH chunk is to use the same RACH chunk, the UE use the same RACH chunk and increase the Tx power to retransmit the preamble sequence. In another example, if the mode of switching RACH chunk is to calculate next RACH chunk index based on previous RACH chunk index, the UE calculates the RACH chunk index based on the configured calculation method and previous RACH chunk index. In yet another example, if the mode of switching RACH chunk is pseudo-random sequence, the UE generates pseudo-random sequence as configured and then calculate the RACH chunk index for preamble retransmission.

In step 6, the UE is configured to detect the RAR based on the RACH configuration. In one example, if the RAR type is 0, i.e., RAR is sent in PDSCH indicated by a DCI with RA-RNTI, the UE is configured to detect DCI with RA-RNTI and then decode the scheduled PDSCH. In another example, if the RAR type is 1, i.e. RAR is sent by Tx beam sweeping, the UE is configured to obtain the RAR Tx beam sweeping configuration from the system information channel and then the UE is configured to decode the RAR from each RAR chance.

In step 7, the UE is configured to transmit msg3 according to the scheduling information delivered in RAR. In one example, if the UE is configured to include a Tx beam ID in msg3, the UE include a Tx beam ID with the best RSRP in msg3.

In step 8, the UE is configured to receive the msg4.

Figure 12:
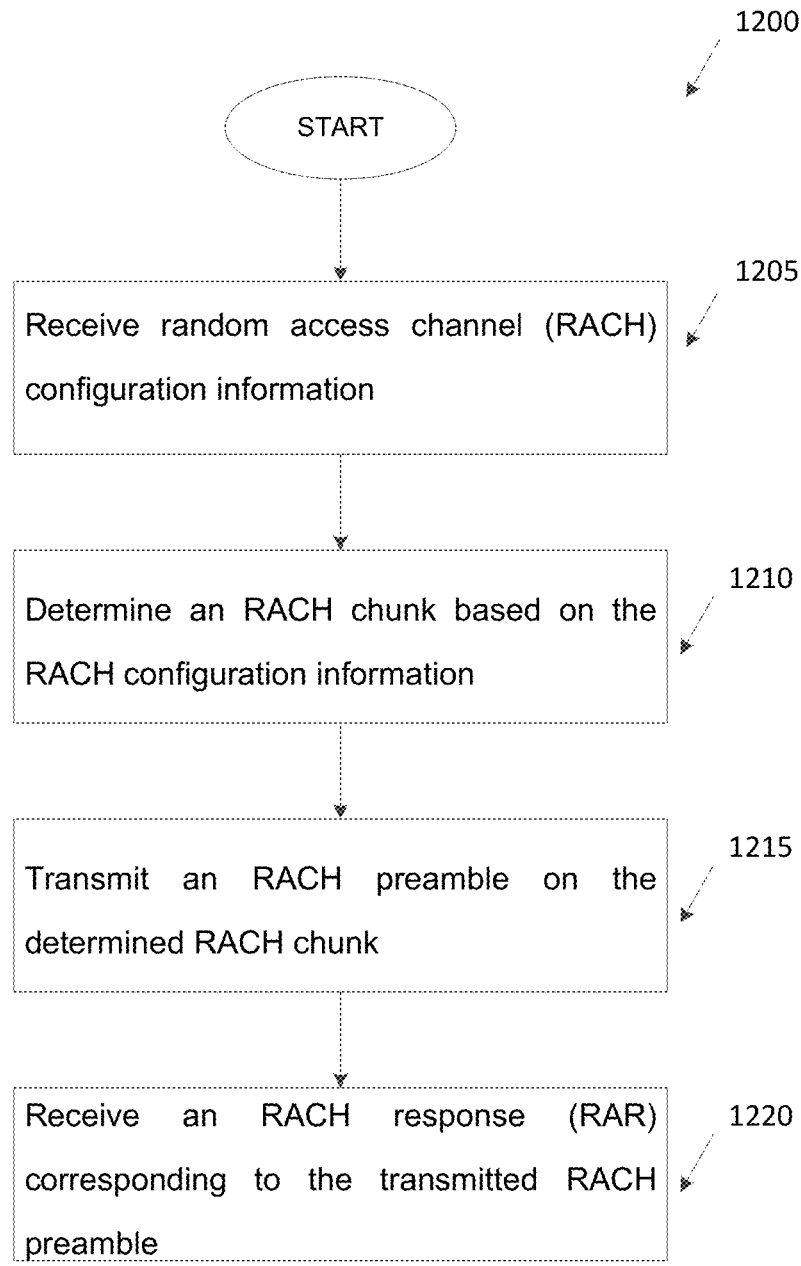
FIG. 12 illustrates a flow chart of a method for RACH procedure according to embodiments of the present disclosure

FIG. 12 illustrates a flow chart of a method 1200 for RACH procedure, as may be performed by a UE (111-116 as illustrated in FIG. 1), according to embodiments of the present disclosure. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

As shown in FIG. 12, the method 1200 begins at step 1205. In step 1205, the UE receives, from a base station (BS), random access channel (RACH) configuration information including RACH chunk information corresponding to at least one antenna beam including a beam identifier (ID). In step 1205, the RACH configuration information comprises at least one of the index of the slot, the index of the RACH chunk, partitioning information, beam sweeping information, a preamble type, or retransmission information.

Next, the UE in step 1210 determines an RACH chunk based on the RACH configuration information received from the BS. In some embodiments, the UE in step 1210 further determines an RACH occasion for the RACH preamble by re-selecting other RACH chunks each of which includes RACH symbols based on the RACH chunk information or performing a power ramping that adjusts a transmit power of the RACH preamble.

In some embodiments, the UE in step 1210 maps, based on the RACH configuration information, downlink signal symbols to RACH chunks, the downlink signal symbols transmitted on at least one of synchronization signal (SS), a broadcasting signal on a physical broadcasting channel (PBCH), or a beam reference signal (BRS).

In some embodiments, the UE in step 1210 maps, based on the RACH configuration information, downlink signal symbols to a subset of RACH preamble sequences, the downlink signal symbols being conveyed by at least one of synchronization signal (SS), a broadcasting signal on a physical broadcasting channel (PBCH), or a beam reference signal (BRS).

Subsequently, in step 1215, the UE transmits, to the BS, an RACH preamble on the determined RACH chunk according to the RACH configuration information associated with the beam ID. In some embodiments, the UE in step 1215 identifies dedicated resources for the BS to apply the at least one antenna beam, transmits the RACH preamble on dedicated resources over which the at least one antenna beam is applied to receive signals, and transmits the RACH preamble over RACH symbols in the determined RACH chunk over the at least one antenna beam that is swept to receive signals.

In some embodiments, the UE in step 1215 transmits the RACH preamble including the beam ID using the RACH chunk from the RACH chunks mapped to at least one downlink signal symbol selected. In some embodiments, the UE in step 1215 transmits the RACH preamble including the beam ID using an RACH preamble sequence from the subset of RACH preamble sequences mapped to at least one downlink signal symbol selected.

Finally, the UE in step 1220 receives, from the BS, an RACH response (RAR) corresponding to the transmitted RACH preamble and a downlink channel for an RAR transmission. In step 1220, a random access-radio network temporary identification (RA-RNTI) is calculated based on an index of a slot and an index of the RACH chunk on which the RACH preamble is transmitted.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for random access operation in a wireless communication system, the UE comprising:
at least one transceiver configured to receive, from a base station (BS), configuration information including a configuration of a random access channel (RACH) occasion, the RACH occasion being a duration for RACH; and
at least one processor configured to determine the RACH occasion based on the configuration information received from the BS,
wherein the transceiver is further configured to:
transmit, to the BS, a preamble on the determined RACH occasion based on the configuration information, and
receive, from the BS, a random access response (RAR) based on a random access radio network temporary identification (RA-RNTI), and
wherein the RA-RNTI is identified based on a slot index and a symbol index of the determined RACH occasion.

2. The UE of claim 1, wherein the RA-RNTI is identified further based on an index of the RACH occasion in a frequency domain.

3. The UE of claim 1, wherein the at least one processor is further configured to perform a power ramping that adjusts a transmit power of the preamble.

4. The UE of claim 1, wherein the at least one processor is further configured to re-transmit the preamble with a same transmit power as a transmit power of the transmitted preamble.

5. The UE of claim 1, wherein the at least one processor is further configured to re-transmit the preamble with an increased transmit power from a transmit power of the transmitted preamble.

6. The UE of claim 1, wherein:
the at least one processor is further configured to map, based on the configuration information, downlink signal symbols to RACH occasions, the downlink signal symbols being transmitted on at least one of a synchronization signal (SS), a broadcasting signal on a physical broadcasting channel (PBCH), or a beam reference signal (BRS); and
the transceiver is further configured to transmit a preamble including a beam ID using a RACH occasion from the RACH occasions mapped to at least one downlink signal symbol.

7. The UE of claim 1, wherein:
the at least one processor is further configured to map, based on the configuration information, downlink signal symbols to a subset of preamble sequences, the downlink signal symbols being conveyed by at least one of a synchronization signal (SS), a broadcasting signal on a physical broadcasting channel (PBCH), or a beam reference signal (BRS); and
the transceiver is further configured to transmit the preamble including a beam ID using a preamble sequence from the subset of preamble sequences mapped to at least one downlink signal symbol.

8. A base station (BS) for random access operation in a wireless communication system, the BS comprising:
at least one transceiver configured to:
transmit, to a user equipment (UE), configuration information including a configuration of a random access channel (RACH) occasion, the RACH occasion being a duration for RACH, receive, from the UE, a preamble on the RACH occasion based on the configuration information, and transmit, to the UE, a random access response (RAR) based on a random access radio network temporary identification (RA-RNTI), wherein the RA-RNTI is identified based on a slot index and a symbol index of the RACH occasion.

9. The BS of claim 8, wherein the RA-RNTI is identified further based on an index of the RACH occasion in a frequency domain.

10. The BS of claim 8, wherein the transceiver is further configured to receive a preamble retransmitted from the UE, wherein the retransmitted preamble has a transmit power adjusted by a power ramping.

11. The BS of claim 8, wherein the transceiver is further configured to receive from the UE a preamble retransmitted with a same transmit power as a transmit power of the received preamble.

12. The BS of claim 8, wherein the transceiver is further configured to receive from the UE a preamble retransmitted with an increased transmit power from a transmit power of the received preamble.

13. The BS of claim 8, further comprising:

at least one processor configured to map, based on the configuration information, downlink signal symbols to RACH occasions, the downlink signal symbols being transmitted on at least one of a synchronization signal (SS), a broadcasting signal on a physical broadcasting channel (PBCH), or a beam reference signal (BRS); and the transceiver is further configured to receive a preamble including a beam ID using a RACH occasion from the RACH occasions mapped to at least one downlink signal symbol.

14. The BS of claim 8, further comprising:

at least one processor configured to map, based on the configuration information, downlink signal symbols to a subset of preamble sequences, the downlink signal symbols being conveyed by at least one of a synchronization signal (SS), a broadcasting signal on a physical broadcasting channel (PBCH), or a beam reference signal (BRS); and the transceiver is further configured to receive a preamble including a beam ID using a preamble sequence from the subset of preamble sequences mapped to at least one downlink signal symbol.

15. A method of user equipment (UE) for random access operation in a wireless communication system, the method comprising:

receiving, from a base station (BS), configuration information including a configuration of a random access channel (RACH) occasion, the RACH occasion being a duration for RACH;

determining the RACH occasion based on the configuration information received from the BS, transmitting, to the BS, a preamble on the determined RACH occasion based on the configuration information; and receiving, from the BS, a random access response (RAR) based on a random access radio network temporary identification (RA-RNTI), wherein the RA-RNTI is identified based on a slot index and a symbol index of the determined RACH occasion.

16. The method of claim 15, wherein the RA-RNTI is identified further based on an index of the RACH occasion in a frequency domain.

17. The method of claim 15, further comprising:

performing a power ramping that adjusts a transmit power of the preamble.

18. The method of claim 15, further comprising:

re-transmitting the preamble with a same transmit power as a transmit power of the transmitted preamble.

19. The method of claim 15, further comprising:

re-transmitting the preamble with an increased transmit power from a transmit power of the transmitted preamble.

20. The method of claim 15, further comprising:

mapping, based on the configuration information, downlink signal symbols to RACH occasions, the downlink signal symbols being transmitted on at least one of a synchronization signal (SS), a broadcasting signal on a physical broadcasting channel (PBCH), or a beam reference signal (BRS); and transmitting a preamble including a beam ID using a RACH occasion from the RACH occasions mapped to at least one downlink signal symbol.

* * * * *